US012487606B2

(12) United States Patent
Groden et al.

(10) Patent No.: US 12,487,606 B2
(45) Date of Patent: *Dec. 2, 2025

(54) VEHICLE CONTROL ROUTER

(71) Applicant: Skyryse, Inc., El Segundo, CA (US)

(72) Inventors: Mark Groden, Marina Del Rey, CA (US); Gonzalo Javier Rey, Torrance, CA (US); Christopher Camilo Cole, Santa Monica, CA (US); Christopher Ryan Smith, Torrance, CA (US)

(73) Assignee: Skyryse, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,216

(22) Filed: Nov. 29, 2023

(65) Prior Publication Data

US 2024/0201693 A1    Jun. 20, 2024

Related U.S. Application Data

(63) Continuation of application No. 17/370,415, filed on Jul. 8, 2021, now Pat. No. 11,874,674.

(Continued)

(51) Int. Cl.
*G05D 1/00* (2024.01)
*G05D 1/221* (2024.01)
(Continued)

(52) U.S. Cl.
CPC ......... *G05D 1/101* (2013.01); *G05D 1/0016* (2013.01); *G05D 1/0088* (2013.01); *G05D 1/221* (2024.01); *G05D 1/228* (2024.01); *G05D 1/46* (2024.01)

(58) Field of Classification Search
CPC ..................................................... G05D 1/101
See application file for complete search history.

(56) References Cited

U.S. PATENT DOCUMENTS 9,334,052 B2    5/2016 Pasko et al.
9,658,619 B1    5/2017 Bethke et al.
(Continued)

FOREIGN PATENT DOCUMENTS

WO    WO-2015003767 A1    1/2015
WO    WO-2018217210 A1    11/2018

OTHER PUBLICATIONS

PCT International Search Report and Written Opinion, PCT Application No. PCT/US2021/040889, Oct. 13, 2021, 17 pages.

(Continued)

*Primary Examiner* — Michael A Berns
(74) *Attorney, Agent, or Firm* — Fenwick & West LLP

(57) ABSTRACT

Embodiments relate to an aircraft control router for an aircraft. The aircraft control router may include a command processing module, sensor validation module, aircraft state estimation module, and control laws module. The command processing module may be configured to generate aircraft trajectory values based on received aircraft control inputs. The sensor validation module may be configured to validate sensor signals generated by sensors of the aircraft. The aircraft state estimation module may be configured to determine an estimated aircraft state of the aircraft based on the validated sensor signals. The control laws module may be configured to generate actuator commands for actuators of the aircraft to adjust control surfaces of the aircraft, where the generated actuator commands are based on aircraft trajectory values, validated sensor signals, and an estimated aircraft state. The aircraft control router may transmit the generated actuator commands to actuators of the aircraft.

20 Claims, 10 Drawing Sheets

Related U.S. Application Data

(60) Provisional application No. 63/059,491, filed on Jul. 31, 2020, provisional application No. 63/049,553, filed on Jul. 8, 2020, provisional application No. 63/049,567, filed on Jul. 8, 2020.

(51) Int. Cl.
*G05D 1/228* (2024.01)
*G05D 1/46* (2024.01)

(56) References Cited

U.S. PATENT DOCUMENTS

| | | |
|---|---|---|
| 9,849,044 B1 | 12/2017 | Groden et al. |
| 10,173,681 B2 | 1/2019 | Baum et al. |
| 10,824,141 B2 | 11/2020 | Chen |
| 10,921,826 B2 | 2/2021 | Groden et al. |
| 10,935,985 B2 | 3/2021 | Irwin et al. |
| 11,538,203 B2 | 12/2022 | Holder et al. |
| 11,794,916 B2 * | 10/2023 | Mark .................... B64D 31/00 |
| 11,874,674 B2 * | 1/2024 | Groden .................... G08G 5/55 |
| 2014/0027565 A1 | 1/2014 | Marvin et al. |
| 2014/0052293 A1 | 2/2014 | Bruemmer et al. |
| 2015/0336668 A1 | 11/2015 | Pasko et al. |
| 2017/0017241 A1 | 1/2017 | Gillett et al. |
| 2019/0004542 A1 | 1/2019 | Kim |
| 2019/0033862 A1 | 1/2019 | Groden et al. |
| 2019/0064794 A1 | 2/2019 | Chen |
| 2019/0317529 A1 | 10/2019 | Matus et al. |
| 2020/0090524 A1 | 3/2020 | Cherepinsky et al. |
| 2021/0354840 A1 | 11/2021 | Mark et al. |
| 2022/0011783 A1 | 1/2022 | Groden et al. |
| 2022/0326704 A1 | 10/2022 | Moy et al. |
| 2024/0201693 A1 * | 6/2024 | Groden .................... G05D 1/228 |

OTHER PUBLICATIONS

PCT International Search Report and Written Opinion, PCT Application No. PCT/US23/36046, Jan. 31, 2024, 15 pages.
United States Office Action, U.S. Appl. No. 17/370,415, filed Apr. 4, 2023, 34 pages.

* cited by examiner

800

Receive set of aircraft control inputs describing a requested trajectory for an aircraft

810

Generate, using the aircraft control inputs, a plurality of trajectory values for axes of movement of the aircraft, the plurality of trajectory values corresponding to the requested trajectory

820

Generate, using information describing characteristics of the aircraft and the plurality of trajectory values, a plurality of actuator commands for a plurality of actuators of the aircraft

830

Transmit the plurality of actuators commands to corresponding actuators to adjust a current trajectory of the aircraft to the requested trajectory
840

FIG. 8

VEHICLE CONTROL ROUTER

CROSS REFERENCE TO RELATED APPLICATIONS

This application is a continuation of U.S. application Ser. No. 17/370,415, filed Jul. 8, 2021, which claims priority to and the benefit of U.S. Provisional Application No. 63/049,553, filed Jul. 8, 2020, U.S. Provisional Application No. 63/049,567, filed Jul. 8, 2020, and U.S. Provisional Application No. 63/059,491, filed Jul. 31, 2020, each of which is incorporated by reference herein in its entirety.

TECHNICAL FIELD

The disclosure generally relates to the field of vehicle control systems, and particularly to vehicle-agnostic control systems.

BACKGROUND

Vehicles control and interface systems, such as control systems for aerial vehicles (e.g., rotorcraft or fixed-wing aircraft), often require specialized knowledge and training for operation by a human operator. The specialized knowledge and training is necessitated, for instance, by the complexity of the control systems and safety requirements of the corresponding vehicles. Moreover, conventional vehicle control and interface systems include multiple vehicle-specific interfaces or inceptors for providing precursor inputs to adjust a trajectory of a vehicle (e.g., cyclic, collective, and pedal interfaces of a rotorcraft or stick, power, or pedal interfaces of a fixed-wing aircraft). The multiple interfaces of such conventional vehicle control and interface systems are specifically designed for types or versions of certain vehicles. As such, even those trained to operate one vehicle control and interface system may be unable to operate another vehicle control and control system for the same or similar type of vehicle without additional training. Although some conventional vehicles control and interface systems provide processes for partially or fully automated vehicle control, such systems are still designed for individual vehicle contexts. As such, improved vehicle control and interface systems are needed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 8 is a flow diagram illustrating one example embodiment of a process for generating actuator commands for aircraft control inputs via an aircraft control router.

DETAILED DESCRIPTION

Figure 1:
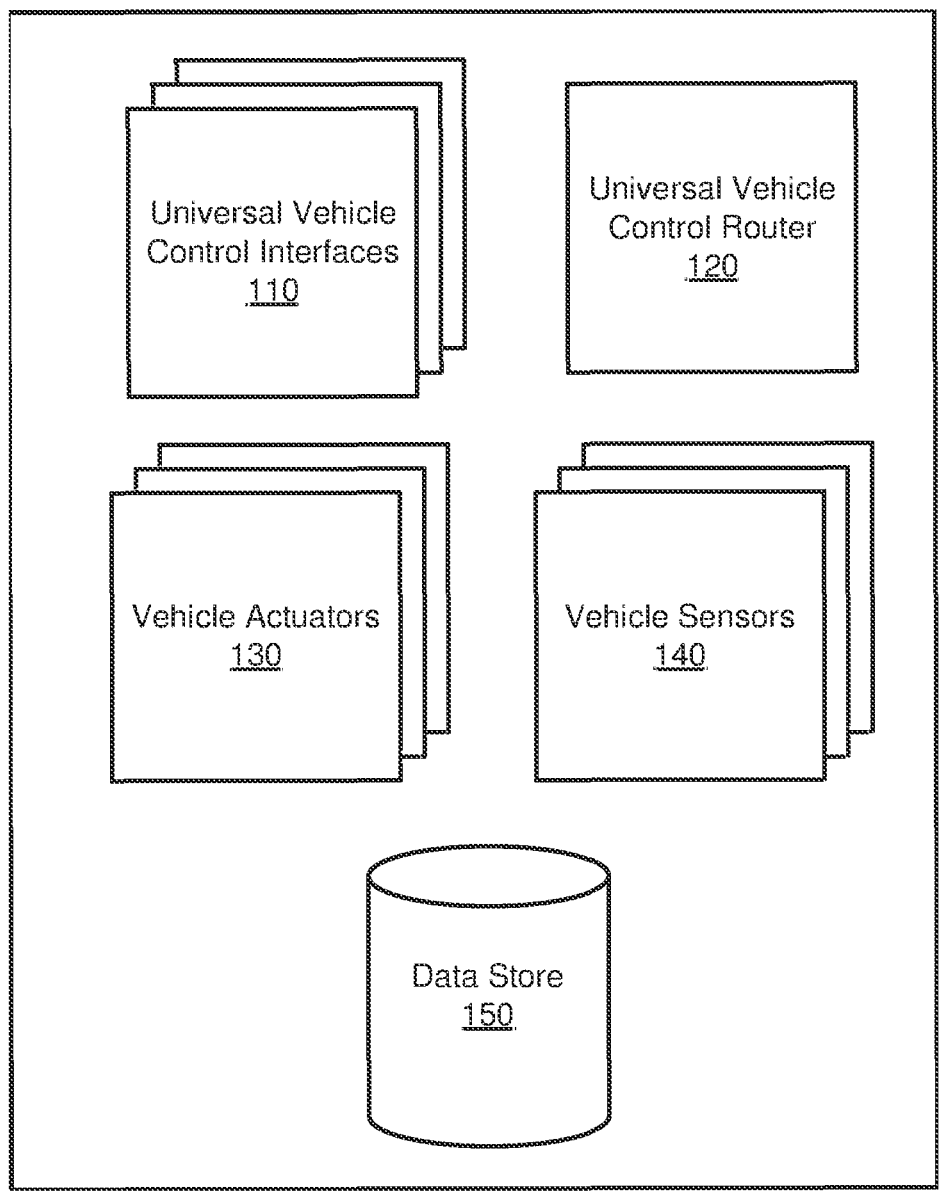
FIG. 1 illustrates one example embodiment of a vehicle control and interface system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of a disclosed system, method and a non-transitory computer readable storage medium that includes a vehicle control and interface system for controlling different vehicles through universal mechanisms. The vehicle control and interface system may be integrated with different types of vehicles (e.g., rotorcraft, fixed-wing aircraft, motor vehicles, watercraft, etc.) in order to facilitate operation of the different vehicles using universal vehicle control inputs. In particular, the vehicle control and interface system receives vehicle control inputs from one or more universal vehicle control interfaces describing a requested trajectory of the vehicle. The vehicle control and interface system converts (or translates) the vehicle control inputs into commands for specific actuators of the vehicle configured to achieve the requested trajectory. By way of example, to convert the vehicle control inputs to actuator commands, the vehicle control and interface system processes the inputs using a universal vehicle control router.

In example embodiments, the universal vehicle control router may include a command processing step configured to convert the vehicle control inputs into one or trajectory values along axes of movement trajectory of the vehicle. For example, the inputs may include a requested forward speed, requested lateral speed, requested vertical speed, and a requested turn rate for vehicle (e.g., an angular velocity). In this case if the vehicle is, e.g., a rotorcraft, the vehicle-control system may convert the vehicle control inputs into a forward velocity, lateral velocity, vertical velocity, and an angular velocity around a yaw axis for the rotorcraft. The universal vehicle control router may further be configured to convert the trajectory values for the axes of movement of the vehicle into corresponding actuator commands for actuators of the vehicle configured to control the actuators to adjust a current trajectory of the vehicle to the requested trajectory. For example, continuing with the above example, the vehicle control system may translate the trajectory values for the axes of movement of the rotorcraft into a combination of one or more of a lateral cyclic command, a longitudinal cyclic command, a pedal command, and a collective command for actuators of the rotorcraft. Additionally, the vehicle control system may convert the trajectory values for the axes of movement for the vehicle to allowable trajectory values in consideration of a set of control laws (e.g., maximum velocities, maximum rotor revolutions per minute (RPM), maximum banking angle, etc.).

Example System Environment

Figure (FIG. 1 illustrates one example embodiment of a vehicle control and interface system 100. In the example embodiment shown, vehicle control and interface system 100 includes one or more universal vehicle control interfaces 110, universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with fixed-wing aircraft (e.g., airplanes), rotorcraft (e.g., helicopters), motor vehicles (e.g., automobiles), watercraft (e.g., power boats or submarines), or any other suitable vehicle. As described in greater detail below with reference to FIGS. 1-8, the vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate or be architected in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aircraft) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 is a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. Additionally, or alternatively, the universal vehicle control interfaces 110 may include one or more hardware input devices, e.g., one or more control sticks inceptors, such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to received universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aircraft systems include different stick or yoke (controlling pitch and role), power (controlling forward movement), and pedal (controlling yaw) inceptors. Example configurations of the universal vehicle control interfaces 110 are described in greater detail below with reference to FIGS. 2-5 and 6A-D.

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed or continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle. Embodiments of interfaces providing feedback information to an operator of a vehicle are described in greater detail below with reference to FIG. 6A-C.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the aircraft, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aircraft), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands. Embodiments of the universal vehicle control router 120 are described in greater detail below with reference to FIG. 3.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aircraft, in processing a turn speed increase universal input the universal vehicle control router 120 may generate actuator commands causing the fixed-wing aircraft to perform tight ground turn if the fixed-wing aircraft is grounded and ignore the turn speed increase universal input if the fixed-wing aircraft is in another phase of operation. One skilled in the art will appreciate that the universal vehicle control router 120 may perform other suitable processing of universal vehicle control inputs to generate actuator commands in consideration of vehicle operation phases for various vehicles.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aircraft the vehicle actuators 130 may include actuators for controlling a rudder, elevator, ailerons, and power-plant of the fixed-wing aircraft.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases the vehicle sensors 140 may include, for example, redundant sensor channels for some or all of the vehicle sensors 140. The vehicle control and interface system 100 may use data captured by the vehicle sensors 140 for various processes. By way of example, the universal vehicle control router 120 may use vehicle sensor data captured by the vehicle sensors 140 to determine an estimated state of the vehicle, as described in greater detail below with reference to FIG. 3.

The data store 150 is a database storing various data for the vehicle control and interface system 100. For instance, the data store 150 may store sensor data (e.g., captured by the vehicle sensors 140), vehicle models, vehicle metadata, or any other suitable data.

Figure 2:
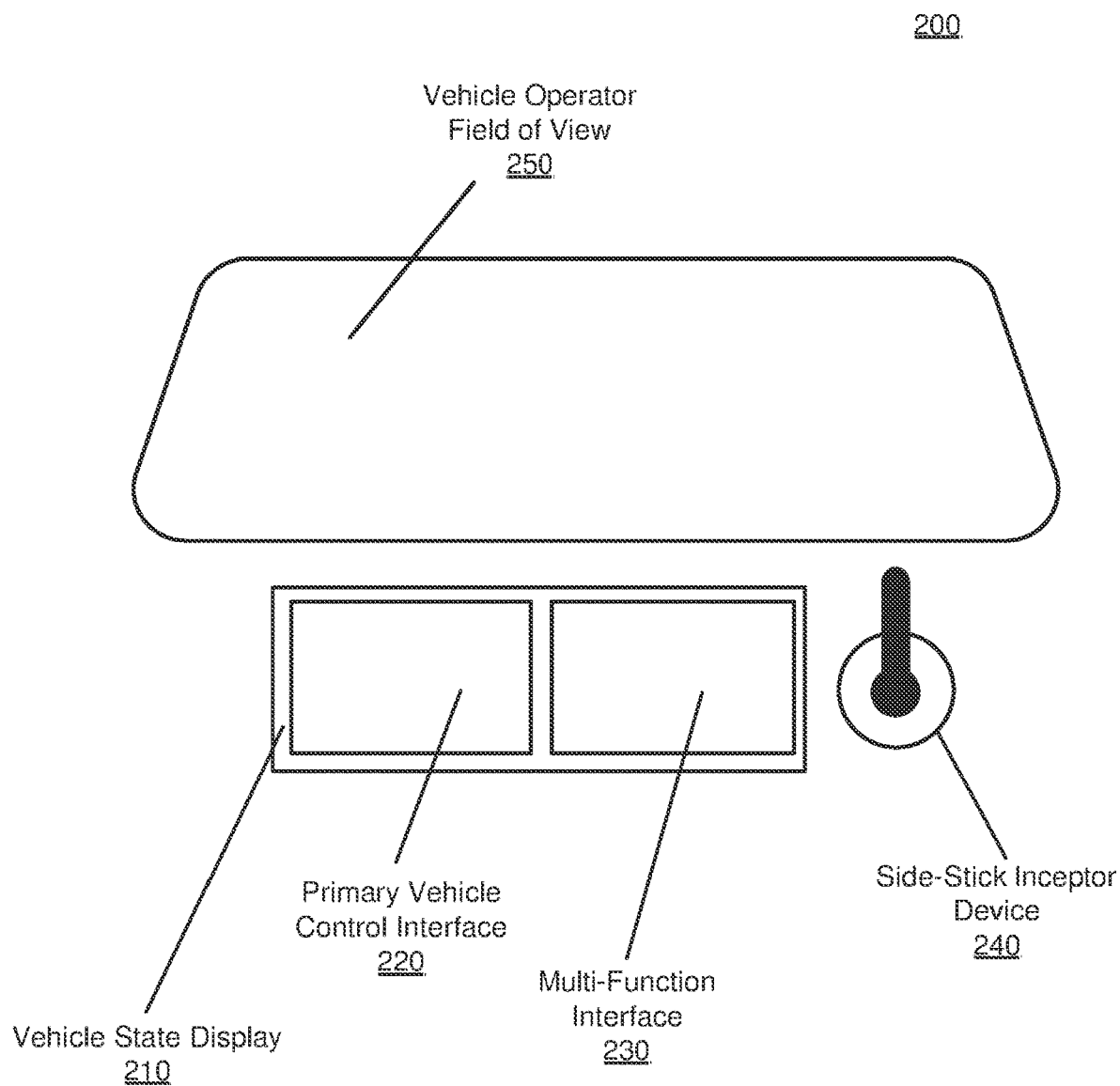
FIG. 2 illustrates one example embodiment of a configuration for a set of universal vehicle control interfaces in a vehicle.

FIG. 2 illustrates one example embodiment of a configuration 200 for a set of universal vehicle control interfaces in a vehicle. The vehicle control interfaces in the configuration 200 may be embodiments of the universal vehicle control interfaces 110, as described above with reference to FIG. 1. In the embodiment shown, the configuration 200 includes, a vehicle state display 210, a side-stick inceptor device 240, and a vehicle operator field of view 250. In other embodiments, the configuration 200 may include different or additional elements. Furthermore, the functionality may be distributed among the elements in a different manner than described.

The vehicle state display 210 is one or more electronic displays (e.g., liquid-crystal displays (LCDs)) configured to display or receive information describing a state of the vehicle including the configuration 200. In particular, the vehicle state display 210 may display various interfaces including feedback information for an operator of the vehicle. In this case, the vehicle state display 210 may provide feedback information to the operator in the form of virtual maps, 3D terrain visualizations (e.g., wireframe, rendering, environment skin, etc.), traffic, weather, engine status, communication data (e.g., air traffic control (ATC) communication), guidance information (e.g., guidance parameters, trajectory), and any other pertinent information. Additionally, or alternatively, the vehicle state display 210 may display various interfaces for configuring or executing automated vehicle control processes, such as automated aircraft landing or takeoff or navigation to a target location. The vehicle state display 210 may receive user inputs via various mechanisms, such as gesture inputs (as described above with reference to the gesture interface 220), audio inputs, or any other suitable input mechanism. Embodiments of the vehicle state display 230 are described in greater detail below with reference to FIGS. 3 and 6A-C.

As depicted in FIG. 2 the vehicle state display 210 includes a primary vehicle control interface 220 and a multi-function interface 230. The primary vehicle control interface 220 is configured to facilitate short-term control of the vehicle including the configuration 200. In particular, the primary vehicle control interface 220 includes information immediately relevant to control of the vehicle, such as current universal control input values or a current state of the vehicle. As an example, the primary vehicle control interface 220 may include a virtual object representing the vehicle in 3D or 2D space. In this case, the primary vehicle control interface 220 may adjust the display of the virtual object responsive to operations performed by the vehicle in order to provide an operator of the vehicle with visual feedback. The primary vehicle control interface 220 may additionally, or alternatively, receive universal vehicle control inputs via gesture inputs. Example embodiments of the primary vehicle control interface 220 are described in greater detail below with reference to FIGS. 6A-C.

The multi-function interface 230 is configured to facilitate long-term control of the vehicle including the configuration 200. In particular, the primary vehicle control interface 220 may include information describing a mission for the vehicle (e.g., navigation to a target destination) or information describing the vehicle systems. Information describing the mission may include routing information, mapping information, or other suitable information. Information describing the vehicle systems may include engine health status, engine power utilization, fuel, lights, vehicle environment, or other suitable information. In some embodiments, the multi-function interface 230 or other interfaces enable mission planning for operation of a vehicle. For example, the multi-function interface 230 may enable configuring missions for navigating a vehicle from a start location to a target location. In some cases, the multi-function interface 230 or another interface provides access to a marketplace of applications and services. The multi-function interface 230 may also include a map, a radio tuner, or a variety of other controls and system functions for the vehicle. An example embodiment of the multi-function interface 230 is described in greater detail below with reference to FIG. 6A-D.

In some embodiments, the vehicle state display 210 includes information describing a current state of the vehicle relative to one or more control limits of the vehicle (e.g., on the primary vehicle control interface 220 or the multi-function interface 230). For example, the information may describe power limits of the vehicle or include information indicating how much control authority a user has across each axis of movement for the vehicle (e.g., available speed, turning ability, climb or descent ability for an aircraft, etc.). In the same or different example embodiment, the vehicle state display 210 may display different information depending on a level of experience of a human operator of the vehicle. For instance, if the vehicle is an aircraft and the human operator is new to flying, the vehicle state display may include information indicating a difficulty rating for available flight paths (e.g., beginner, intermediate, or expert). The particular experience level determined for an operator may be based upon prior data collected and analyzed about the human operator corresponding to their prior experiences in flying with flight paths having similar expected parameters. Additionally, or alternatively, flight path difficulty ratings for available flight paths provided to the human operator may be determined based on various information, for example, expected traffic, terrain fluctuations, airspace traffic and traffic type, how many airspaces and air traffic controllers along the way, or various other factors or variables that are projected for a particular flight path. Moreover, the data collected from execution of this flight path can be fed back into the database and applied to a machine learning model to generate additional and/or refined ratings data for the operator for subsequent application to other flight paths. Vehicle operations may further be filtered according to which one is the fastest, the most fuel efficient, or the most scenic, etc.

The one or more vehicle state displays 210 may include one or more electronic displays (e.g., liquid-crystal displays (LCDs), organic light emitting diodes (OLED), plasma). For example, the vehicle state display 210 may include a first electronic display for the primary vehicle control interface 220 and a second electronic display for the multi-function interface 230. In cases where the vehicle state display 210 include multiple electronic displays, the vehicle state display 210 may be configured to adjust interfaces displayed using the multiple electronic displays, e.g., in response to failure of one of the electronic displays. For example, if an electronic display rendering the primary vehicle control interface 240 fails, the vehicle state display 210 may display some or all of the primary vehicle control interface 240 on another electronic display.

The one or more electronic displays of the vehicle state display 210 may be touch sensitive displays is configured to receive touch inputs from an operator of the vehicle including the configuration 200, such as a multi-touch display. For instance, the primary vehicle control interface 220 may be a gesture interface configured to receive universal vehicle control inputs for controlling the vehicle including the configuration 200 via touch gesture inputs. In some cases, the one or more electronic displays may receive inputs via other type of gestures, such as gestures received via an optical mouse, roller wheel, three-dimensional (3D) mouse, motion tracking device (e.g., optical tracking), or any other suitable device for receiving gesture inputs. Embodiments of a gesture interface are described in greater detail below with reference to FIGS. 3, 4, and 5.

Touch gesture inputs received by one or more electronic displays of the vehicle state display 210 may include single finger gestures (e.g., executing a predetermined pattern, swipe, slide, etc.), multi-finger gestures (e.g., 2, 3, 4, 5 fingers, but also palm, multi-hand, including/excluding thumb, etc.; same or different motion as single finger gestures), pattern gestures (e.g., circle, twist, convergence, divergence, multi-finger bifurcating swipe, etc.), or any other suitable gesture inputs. Gesture inputs can be limited asynchronous inputs (e.g., single input at a time) or can allow for multiple concurrent or synchronous inputs. In variants, gesture input axes can be fully decoupled or independent. In a specific example, requesting a speed change holds other universal vehicle control input parameters fixed—where vehicle control can be automatically adjusted in order to implement the speed change while holding heading and vertical rate fixed. Alternatively, gesture axes can include one or more mutual dependencies with other control axes. Unlike conventional vehicle control systems, such as aircraft control systems, the gesture input configuration as disclosed provides for more intuitive user experiences with respect to an interface to control vehicle movement.

In some embodiments, the vehicle state display 220 or other interfaces are configured to adjust in response to vehicle operation events, such as emergency conditions. For instance, in response to determining the vehicle is in an emergency condition, the vehicle control and interface system 100 may adjust the vehicle state display 210 to include essential information or remove irrelevant information. As an example, if the vehicle is an aircraft and the vehicle control and interface system 100 detects an engine failure for the aircraft, the vehicle control and interface system 100 may display essential information on the vehicle state display 210 including 1) a direction of the wind, 2) an available glide range for the aircraft (e.g., a distance that the aircraft can glide given current conditions), or 3) available emergency landing spots within the glide range. The vehicle control and interface system 100 may identify emergency landing locations using various processes, such as by accessing a database of landing spots (e.g., included in the data store 150 or a remote database) or ranking landing spots according to their suitability for an emergency landing.

The side-stick inceptor device 240 may be a side-stick inceptor configured to receive universal vehicle control inputs. In particular, the side-stick inceptor device 240 may be configured to receive the same or similar universal vehicle control inputs as a gesture interface of the vehicle state display 210 is configured to receive. In this case, the gesture interface and the side-stick inceptor device 240 may provide redundant or semi-redundant interfaces to a human operator for providing universal vehicle control inputs. The side-stick inceptor device 240 may be active or passive. Additionally, the side-stick inceptor device 240 and may include force feedback mechanisms along any suitable axis. For instance, the side-stick inceptor device 240 may be a 3-axis inceptor, 4-axis inceptor (e.g., with a thumb wheel), or any other suitable inceptor. Processing inputs received via the side-stick inceptor device 240 is described in greater detail below with reference to FIGS. 3 and 5.

The components of the configuration 200 may be integrated with the vehicle including the configuration 200 using various mechanical or electrical components. These components may enable adjustment of one or more interfaces of the configuration 200 for operation by a human operator of the vehicle. For example, these components may enable rotation or translation of the vehicle state display 230 toward or away from a position of the human operator (e.g., a seat where the human operator sits). Such adjustment may be intended, for example, to prevent the interfaces of the configuration 200 from obscuring a line of sight of the human operator to the vehicle operator field of view 250.

The vehicle operator field of view 250 is a first-person field of view of the human operator of the vehicle including the configuration 200. For example, the vehicle operator field of view 250 may be a windshield of the vehicle or other suitable device for enabling a first-person view for a human operator.

The configuration 200 additionally or alternately include other auxiliary feedback mechanisms, which can be auditory (e.g., alarms, buzzers, etc.), haptic (e.g., shakers, haptic alert mechanisms, etc.), visual (e.g., lights, display cues, etc.), or any other suitable feedback components. Furthermore, displays of the configuration 200 (e.g., the vehicle state display 210) can simultaneously or asynchronously function as one or more of different types of interfaces, such as an interface for receiving vehicle control inputs, an interface for displaying navigation information, an interface for providing alerts or notifications to an operator of the vehicle, or any other suitable vehicle instrumentation. Furthermore, portions of the information can be shared between multiple displays or configurable between multiple displays.

Example Vehicle Control Router

Figure 3:
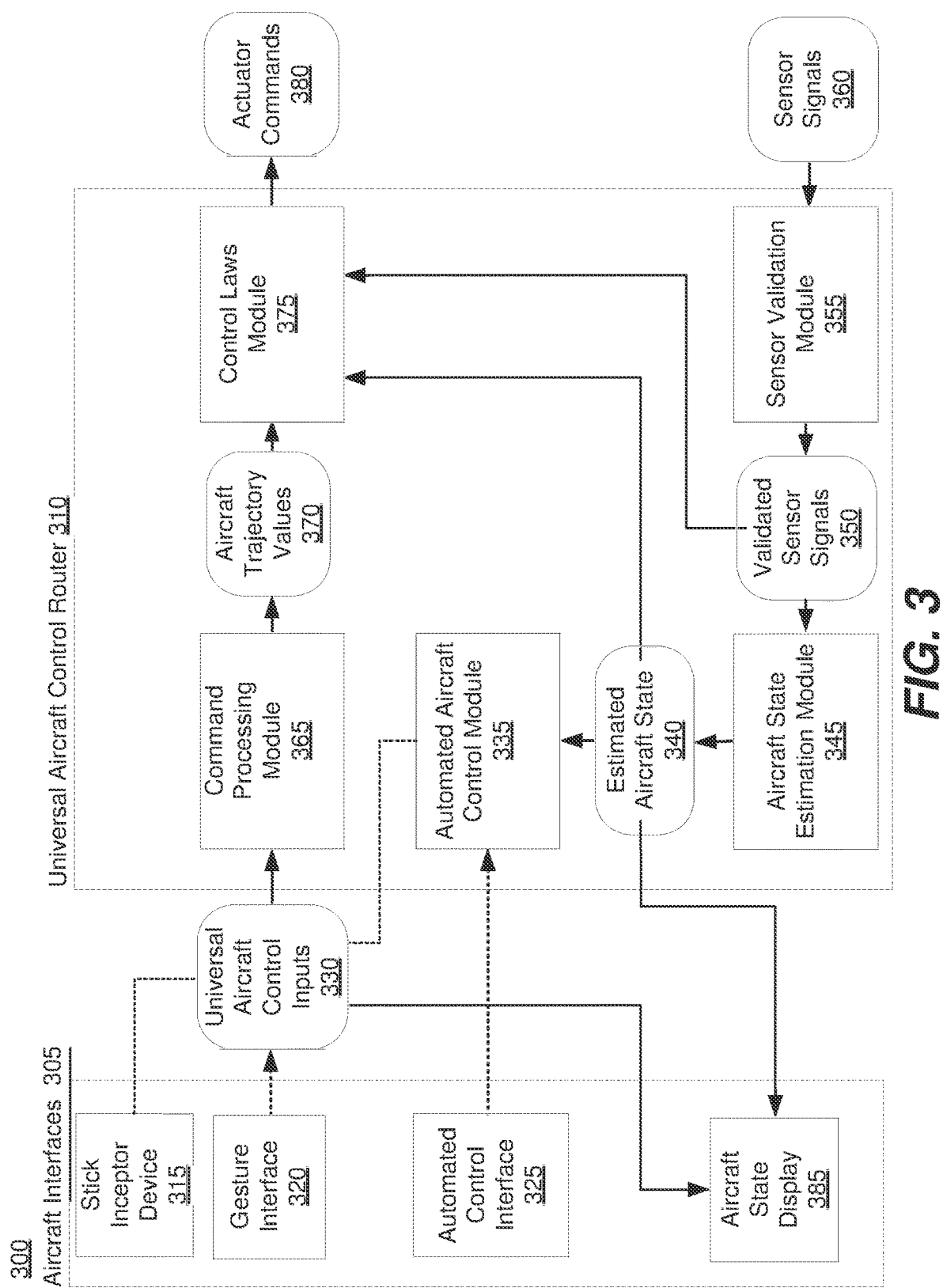
FIG. 3 illustrates one example embodiment of a process flow for a universal aircraft control router to convert a set of universal aircraft control inputs to corresponding actuator commands for a particular aircraft.

FIG. 3 illustrates one embodiment of a process flow 300 for a universal aircraft control router 310 to convert a set of universal aircraft control inputs 330 to corresponding actuator commands 380 for a particular aircraft. The universal aircraft control router 310 may be an embodiment of the universal vehicle control router 120. Although the embodiment depicted in FIG. 3 is particularly directed to operating an aircraft (e.g., a rotorcraft or fixed-wing aircraft), one skilled in the art will appreciate that similar processes can be applied to other vehicles, such as motor vehicles or watercraft.

In the embodiment shown in FIG. 3, the set of universal aircraft control inputs 330 originate from one or more of aircraft interfaces 305. The aircraft interfaces 305 may be embodiments of the universal vehicle control interfaces 110. In particular, the aircraft interfaces 305 include a stick inceptor device 315 (e.g., the side-stick inceptor device 240), a gesture interface (e.g., a gesture interface of the vehicle state display 210), and an automated control interface 325 (e.g., an automated vehicle control interface of the vehicle state display 210). As indicated by the dashed lines, at a given time the universal aircraft control inputs 330 may include input received from some or all of the aircraft interfaces 305.

Inputs received from the stick inceptor device 315 or the gesture interface 320 are routed directly to the command processing module 365 as universal aircraft control inputs 330. Conversely, inputs received from the automated control interface 325 are routed to an automated aircraft control module 335 of the universal aircraft control router 310. Inputs received by the automated aircraft module may include information for selecting or configuring automated control processes. The automated control processes may include automated aircraft control macros (e.g., operation routines), such as automatically adjusting the aircraft to a requested aircraft state (e.g., a requested forward velocity, a requested lateral velocity, a requested altitude, a requested heading, a requested landing, a requested takeoff, etc.). Additionally, or alternatively, the automated control processes may include automated mission or navigation control, such as navigating an aircraft from an input starting location to an input target location in the air or ground. In these or other cases, the automated aircraft control module 335 generates a set of universal aircraft control inputs suitable for executing the requested automated control processes. The automated aircraft control module 335 may use the estimated aircraft state 340 to generate the set of universal aircraft control inputs, as described below with reference to the aircraft state estimation module 345. Additionally, or alternatively, the automated aircraft control module 335 may generate the set of universal aircraft control inputs over a period of time, for example during execution of a mission to navigate to a target location. The automated aircraft control module 335 further provides generated universal aircraft control inputs for inclusion in the set of universal aircraft control inputs 330.

The aircraft state estimation module 345 determines the estimated aircraft state 340 of the aircraft including the universal aircraft control router 310 using the validated sensor signals 350. The estimated aircraft state 340 may include various information describing a current state of the aircraft, such as an estimated 3D position of the vehicle with respect to the center of the Earth, estimated 3D velocities of the aircraft with respect to the ground or with respect to a moving air mass, an estimated 3D orientation of the aircraft, estimated 3D angular rates of change of the aircraft, an estimated altitude of the aircraft, or any other suitable information describing a current state of the aircraft. The aircraft state estimation module 345 determines the estimated state of the aircraft 340 by combining validated sensor signals 350 captured by different types of sensors of the aircraft, such as the vehicle sensors 140 described above with reference to FIG. 1. In some cases, sensor signals may be captured by different types of sensors of the aircraft at different frequencies or may not be available at a particular time. In such cases, the aircraft state estimation module 345 may adjust the process used to determine the estimated aircraft state 340 depending on which sensor signals are available in the validated sensor signals 350 at a particular time. For example, the aircraft state estimation module 345 may use a global positioning system (GPS) signal to estimate an altitude of the aircraft whenever it is available, and may instead use a pressure signal received from a pressure altimeter to estimate a barometric altitude of the aircraft if the GPS signal is unavailable. As another example, if validated sensor signals 350 are not available for a particular sensor channel the aircraft state estimation module 350 may estimate validated sensor signals for the particular sensor channel. In particular, the aircraft state estimation module 350 may estimate validated sensor signals using a model including parameters for the aircraft. In some cases the parameters of a model for the aircraft may be dynamic, e.g., adjusting with respect to a state of the aircraft. Such dynamic adjustment of model parameters may facilitate more accurate estimation of a future state of the aircraft in the near future or for reduced-lag filtering of the sensor signals.

In some embodiments, the aircraft state estimation module 345 precisely estimates an altitude of the aircraft above a surface of the Earth (e.g., an "altitude above the ground") by combining multiple altitude sensor signals included in the validated sensor signals 350. Altitude sensor signals may include GPS signals, pressure sensor signals, range sensor signals, terrain elevation data, or other suitable information. The aircraft state estimation module 345 may estimate an altitude of the aircraft above an ellipsoid representing the Earth using a GPS signal if the GPS signal is available in the validated sensor signals 350. In this case, the aircraft state estimation module 345 may estimate the altitude above the ground by combining the altitude above the ellipsoid with one or more range sensor signals (e.g., as described above with reference to the vehicle sensors 140) or terrain elevation data. Additionally, or alternatively, the aircraft state estimation module 345 may determine an offset between the altitude above the ellipsoid and a barometric altitude determined, e.g., using sensor signals captured by a pressure altimeter. In this case, aircraft state estimation module 345 may apply the offset to a currently estimated barometric altitude if a GPS signal is unavailable in order to determine a substitute altitude estimate for the altitude above the ellipsoid. In this way, the aircraft state estimation module 345 may still provide precise altitude estimates during GPS signal dropouts the and a barometric altitude using a pressure value received from a pressure altimeter.

Among other advantages, by precisely estimating the altitude above the ground through combining multiple altitude sensor signals, the aircraft state estimation module 345 can provide altitude estimates usable for determining if the aircraft has landed, taken off, or is hovering. Additionally, the aircraft state estimation module 345 can provide altitude estimates indicating precise characteristics of the ground below the aircraft, e.g., if the ground is tilted or level in order to assess if a landing is safe. This is in contrast to conventional systems, which require specialized equipment for determining specific aircraft events requiring precise altitude determinations (e.g., takeoffs or landing) due to imprecise altitude estimates. As an example, the universal aircraft control router 310 can use the precise altitude estimates to perform automatic landing operations at locations that are not equipped with instrument landing systems for poor or zero-visibility conditions (e.g., category II or III instrument landing systems). As another example, universal aircraft control router 310 can use the precise altitude estimates to automatically maintain a constant altitude above ground for a rotorcraft (e.g., during hover-taxi) despite changing ground elevation below the rotorcraft. As still another example, the universal aircraft control router 310 can use the precise altitude estimates to automatically take evasive action to avoid collisions (e.g., ground collisions).

In some embodiments, the aircraft state estimation module 345 estimates a ground plane below the aircraft. In particular, the aircraft state estimation module 345 may estimate the ground plane combing validated sensor signals from multiple range sensors. Additionally, or alternatively, the aircraft state estimation module 345 may estimate of a wind vector by combining a ground velocity, airspeed, or sideslip angle measurements for the aircraft.

The sensor validation module 355 validates sensor signals 360 captured by sensors of the aircraft including the universal aircraft control router 310. For example, the sensor signals 360 may be captured by embodiments of the vehicle sensors 140 described above with reference to FIG. 1. The sensor validation module 355 may use various techniques to validate the sensor signals 360. In particular, the sensor validation module 355 may set flags for each aircraft sensor indicating a state of the sensor that are updated on a periodic or continual basis (e.g., every time step). For instance, the flags may indicate a quality of communication from a sensor (e.g., hardware heartbeat or handshake, a transportation checksum, etc.) whether captured sensor signals are sensical or non-sensical (e.g., within realistic value ranges), or whether captured sensor values are valid or invalid in view of a current state of the aircraft (e.g., as determined using the estimated aircraft state 340). In such cases the sensor validation module 355 may not validate sensor signals form the sensor signals 360 that correspond to aircraft sensors having certain flags set (e.g., nonsensical or invalid sensor signals). Additionally, or alternatively, the sensor validation module 355 may receive sensor signals from different aircraft sensors asynchronously. For example, different aircraft sensors may capture sensor signals at different rates or may experience transient dropouts or spurious signal capture. In order to account for asynchronous reception of sensor signals, the sensor validation module 355 may apply one or more filters to the sensor signals 360 that synchronize the sensor signals for inclusion in the validated sensor signals 350.

In some embodiments, the aircraft sensors include multiple sensors of the same type capturing sensor signals of the same type, referred to herein as redundant sensor channels and redundant sensor signals, respectively. In such cases the sensor validation module may compare redundant sensor signals in order to determine a cross-channel coordinated sensor value. For instance, the sensor validation module 355 may perform a statistical analysis or voting process on redundant sensor signals (e.g., averaging the redundant sensor signals) to determine the cross-channel coordinated sensor value. The sensor validation module 355 may include cross-channel coordinated sensor values in the validated sensor signals 350.

The command processing module 365 generates the aircraft trajectory values 370 using the universal aircraft control inputs 330. The aircraft trajectory values 370 describe universal rates of change of the aircraft along movement axes of the aircraft in one or more dimensions. For instance, the aircraft trajectory values 370 may include 3D linear velocities for each axis of the aircraft (e.g., x-axis or forward velocity, y-axis or lateral velocity, and z-axis or vertical velocity) and an angular velocity around a pivot axis of the vehicle (e.g., degrees per second), such as a yaw around a yaw axis.

In some embodiments the command processing module 365 performs one or more smoothing operations to determine a set of smoothed aircraft trajectory values that gradually achieve a requested aircraft trajectory described by the universal aircraft control inputs 330. For instance, the universal aircraft control inputs 330 may include a forward speed input that requests a significant increase in speed from a current speed (e.g., from 10 knots per second (KTS) to 60 KTS). In this case, the command processing module 365 may perform a smoothing operation to convert the forward speed input to a set of smoothed velocity values corresponding to a gradual increase in forward speed from a current aircraft forward speed to the requested forward speed. The command processing module 365 may include the set of smoothed aircraft trajectory values in the aircraft trajectory values. In some cases, the command processing module 365 may apply different smoothing operations to universal aircraft control inputs originating from different interfaces of the aircraft interfaces 305. For instance, the command processing module 365 may apply more gradual smoothing operations to universal aircraft control inputs received from the gesture interface 320 and less gradual smoothing operations to the stick inceptor device 315. Additionally, or alternatively, the command processing module 365 may apply smoothing operations or other operations to universal aircraft control inputs received from the stick inceptor device 315 in order to generate corresponding aircraft trajectory values that simulate manual operation of the aircraft.

In some embodiments, the command processing module 365 processes individual aircraft control inputs in the universal aircraft control inputs 330 according to an authority level of the individual aircraft control inputs. In particular, the authority levels indicate a processing priority of the individual aircraft control inputs. An authority level of an aircraft control input may correspond to an interface of the aircraft interfaces 305 that the aircraft control input originated from, may correspond to a type of operation the aircraft control input describes, or some combination thereof. In one embodiment, aircraft control inputs received from the stick inceptor device 315 have an authority level with first priority, aircraft control inputs received from the gesture interface 320 have an authority level with second priority, aircraft control inputs received from the automated aircraft control module 335 for executing automated aircraft control macros have an authority level with a third priority, and aircraft control inputs received from the automated aircraft control module 335 for executing automated control missions have an authority level with a fourth priority. Other embodiments may have different authority levels for different aircraft control inputs or may include more, fewer, or different authority levels. As an example, an operator of the aircraft may provide an aircraft control input via the stick inceptor device 315 during execution of an automated mission by the automated aircraft control module 335. In this case, the command processing module 365 interrupts processing of aircraft control inputs corresponding to automated mission in order to process the aircraft control input received from the stick inceptor device 315. In this way, the command processing module 365 may ensure that the operator of the aircraft can take control of the aircraft at any time via a suitable interface.

The control laws module 375 generates the actuator commands (or signals) 380 using the aircraft trajectory values 370. The control laws module 375 includes an outer processing loop and an inner processing loop. The outer processing loop applies a set of control laws to the received aircraft trajectory values 370 to convert the aircraft trajectory values 370 to corresponding allowable aircraft trajectory values. Conversely, the inner processing loop converts the allowable aircraft trajectory values to the actuator commands 380 configured to operate the aircraft to adjust a current trajectory of the aircraft to an allowable trajectory defined by the allowable aircraft trajectory values. Both the outer processing loop and the inner processing loop are configured to operate independently of the particular aircraft including the universal aircraft control router 310. In order to operate independently in this manner, the inner and outer processing loops may use a model including parameters describing characteristics of the aircraft that can be used as input to processes or steps of the outer and inner processing loops. In some embodiments, the model used by the control laws module 375 is a different than the model used by the aircraft state estimation module 345, as described above. For instance, the models used by the control laws module 375 and the aircraft state estimation module 345 may respectively include parameters relevant to determining the actuator commands 380 and relevant to determining the estimated aircraft state 340. The control laws module 375 may use the actuator commands 380 to directly control corresponding actuators, or may provide the actuator commands 380 to one or more other components of the aircraft to be used to operate the corresponding actuators.

The outer processing loop may apply the limit laws in order impose various protections or limits on operation of the aircraft, such as aircraft envelope protections, movement range limits, structural protections, aerodynamic protections, impose regulations (e.g., noise, restricted airspace, etc.), or other suitable protections or limits. Moreover, the limit laws may be dynamic, such as varying depending on an operational state of the aircraft, or static, such as predetermined for a particular type of aircraft or type of aircraft control input. As an example, if the aircraft is a rotorcraft the set of control laws applied by the outer processing loop may include maximum and minimum rotor RPMs, engine power limits, aerodynamic limits such as ring vortex, loss of tail-rotor authority, hover lift forces at altitude, boom strike, maximum bank angle, or side-slip limits. As another example, if the aircraft is a fixed-wing aircraft the set of control laws applied by the outer processing loop may include stall speed protection, bank angle limits, side-slip limits, g-loads, flaps or landing gear max extension speeds, or velocity never exceeds (VNEs). Additionally, or alternatively, the outer processing loop uses the estimated aircraft state 340 to convert the aircraft trajectory values 370 to corresponding allowable aircraft trajectory values. For instance, the outer processing loop may compare a requested aircraft state described by the aircraft trajectory values 370 to the estimated aircraft state 340 in order to determine allowable aircraft trajectory values, e.g., to ensure stabilization of the aircraft.

In some embodiments, the inner processing loop converts the allowable aircraft trajectory values in an initial frame of reference to a set of body trajectory values relative to a body frame of reference for the aircraft. In particular, the set of body trajectory values precisely define movement of the aircraft intended by the allowable aircraft trajectory values. The initial frame of reference may be various suitable frames of reference, such as an inertial frame of reference, a frame of reference including rotations around one or more axes of the inertial frame, or some combination thereof. For instance, if the allowable aircraft trajectory values include a velocity for an x-axis, y-axis, z-axis and a heading rate change, the initial frame of reference may be an inertial frame with a rotation (e.g., yaw) around the z-axis. The body frame includes eight coordinates collectively representing 3D velocities and yaw, pitch, and roll angles of the aircraft.

In the same or different embodiments, the inner processing loop determines a difference between the estimated aircraft state 340 and an intended aircraft state corresponding to the allowable aircraft trajectory values, the difference referred to herein as a "command delta." For example, the inner processing loop may determine the intended aircraft state using the body trajectory values of the aircraft, as described above. The inner processing loop uses the command delta to determine actuator commands 380 configured to operate actuators of the aircraft to adjust the state of the aircraft to the intended aircraft state. In some cases, the inner processing loop applies a gain schedule to the command delta to determine the actuator commands 380. For example, the inner processing loop may operate as a linear-quadratic regulator (LQR). Applying the gain schedule may include applying one or more gain functions to the command delta. The control laws module 375 may determine the gain schedule based on various factors, such as a trim airspeed value corresponding to the linearization of nonlinear aircraft dynamics for the aircraft. In the same or different embodiments, the inner processing loop uses a multiple input and multiple output (MIMO) protocol to determine or transmit the actuator commands 380.

In some embodiments where the aircraft is a rotorcraft, the outer processing loop is configured to facilitate execution of an automatic autorotation process for the rotorcraft. In particular, the automatic autorotation process facilitates autorotation by the rotorcraft during entry, glide, flare, and touch down phases. Additionally, or alternatively, the outer processing loop may be configured to facilitate autorotation by the aircraft in response to one or more emergency conditions (e.g., determined based on the estimated aircraft state 340). Execution of the automatic autorotation process by the outer processing loop offloads operation autorotation rotorcraft maneuvers from a human operator of the rotorcraft, thus simplifying user operation and improving the safety. Furthermore, in embodiments where the aircraft is a fixed-wing aircraft, the outer processing loop may facilitate an automatic landing procedure. In particular, the outer processing loop may facilitate the automatic landing procedure even during emergency conditions, e.g., if an engine of the aircraft has failed. The aircraft state display 385 includes one or more interfaces displaying information describing the estimated aircraft state 340 received from the universal aircraft control router 310. For instance, the aircraft state display may be an embodiment of the aircraft state display 210 described above with reference to FIG. 2. The aircraft state display 385 may display information describing the estimated aircraft state 340 for various reasons, such as to provide feedback to an operator of the aircraft responsive to the universal aircraft control inputs 330 or to facilitate navigation of the aircraft. Example aircraft state interfaces that may be displayed by the aircraft state display 385 are described in greater detail below with reference to FIGS. 6A-D.

Example Vehicle Control Interfaces

FIGS. 4, 5, and 6A-D illustrate embodiments of universal aircraft control inputs and interfaces. For example, the interfaces illustrated by in FIGS. 6A-D may be example embodiments of the universal vehicle control interfaces 110, e.g., which may be rendered and interacted with through on a touch sensitive display. Although the embodiments depicted in FIGS. 4, 5, and 6A-D are particularly directed to operating an aircraft (e.g., a rotorcraft or fixed-wing aircraft), one skilled in the art will appreciate that similar interfaces can be applied to other vehicles, such as motor vehicles or watercraft.

Figure 4:
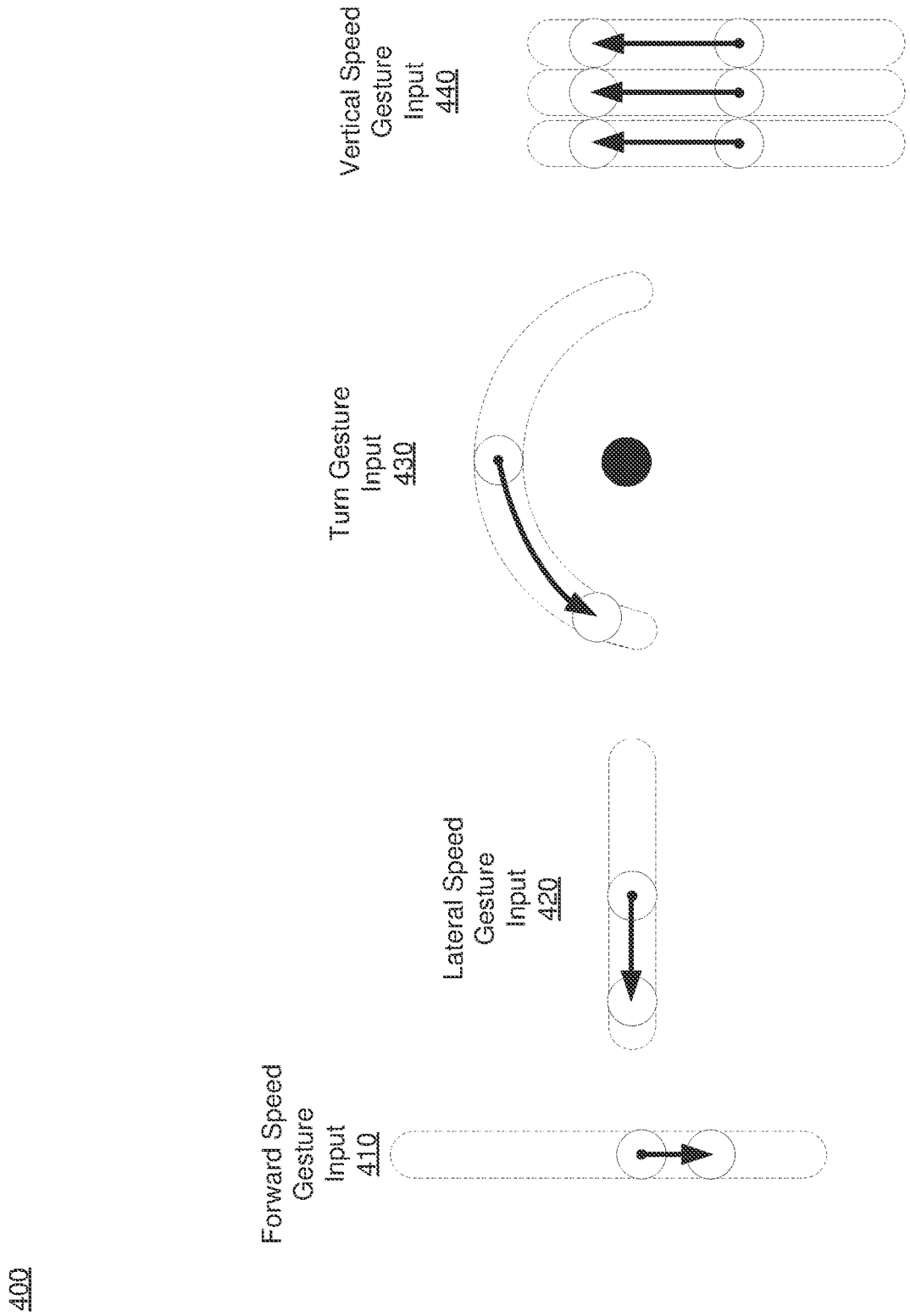
FIG. 4 illustrates one example embodiment of a gesture display configured to provide universal aircraft control inputs for controlling an aircraft.

FIG. 4 illustrates one embodiment of a set of gesture inputs 400 to a gesture interface configured to provide universal aircraft control inputs on a touch sensitive display for controlling an aircraft. As an example, the set of gesture inputs 400 may be received via one of the aircraft interfaces 305. For example, the gesture inputs 400 may be received by the gesture interface 320. In the embodiment shown, the set of gesture inputs 400 include a forward speed gesture input 410, a lateral speed gesture input 420, a turn gesture input 430, and a vertical speed gesture input 440. In other embodiments, the set of gesture inputs 400 may include fewer, more, or different control inputs.

As depicted in FIG. 4, the gesture inputs 410, 420, 430, and 440 illustrate example finger movements from an initial touch position, indicated by circles with black dots, to a final touch position, indicated by circles pointed to by arrows extending from the initial touch positions. The arrows illustrate an example direction of movement for the gesture inputs 410, 420, 430, and 440. As depicted in FIG. 4, the forward speed gesture input 410 illustrates a downward single finger swipe gesture indicating a decrease in aircraft forward speed. The lateral speed gesture input 420 illustrates a leftward single finger swipe gesture indicating a leftward increase in aircraft lateral speed. The turn gesture input 430 illustrates a counter-clockwise double finger swipe gesture indicating a counter-clockwise change in aircraft turn rate, where, e.g., an index finger of a user may be placed at the top initial touch position and the thumb of the user may be placed at the bottom initial touch position. Finally, the vertical speed gesture input 440 illustrates a three-finger upward swipe to indicate an increase in aircraft altitude.

The gesture inputs 410, 420, 430, and 440 further include possible movement regions (indicated by the dashed lines) that indicate a range of possible movements for each of the gesture inputs 410, 420, 430, and 440. For instance, as depicted in FIG. 4 the forward speed gesture input may be a leftward swipe to decrease aircraft forward speed or an upward swipe to increase aircraft forward speed.

Figure 5:
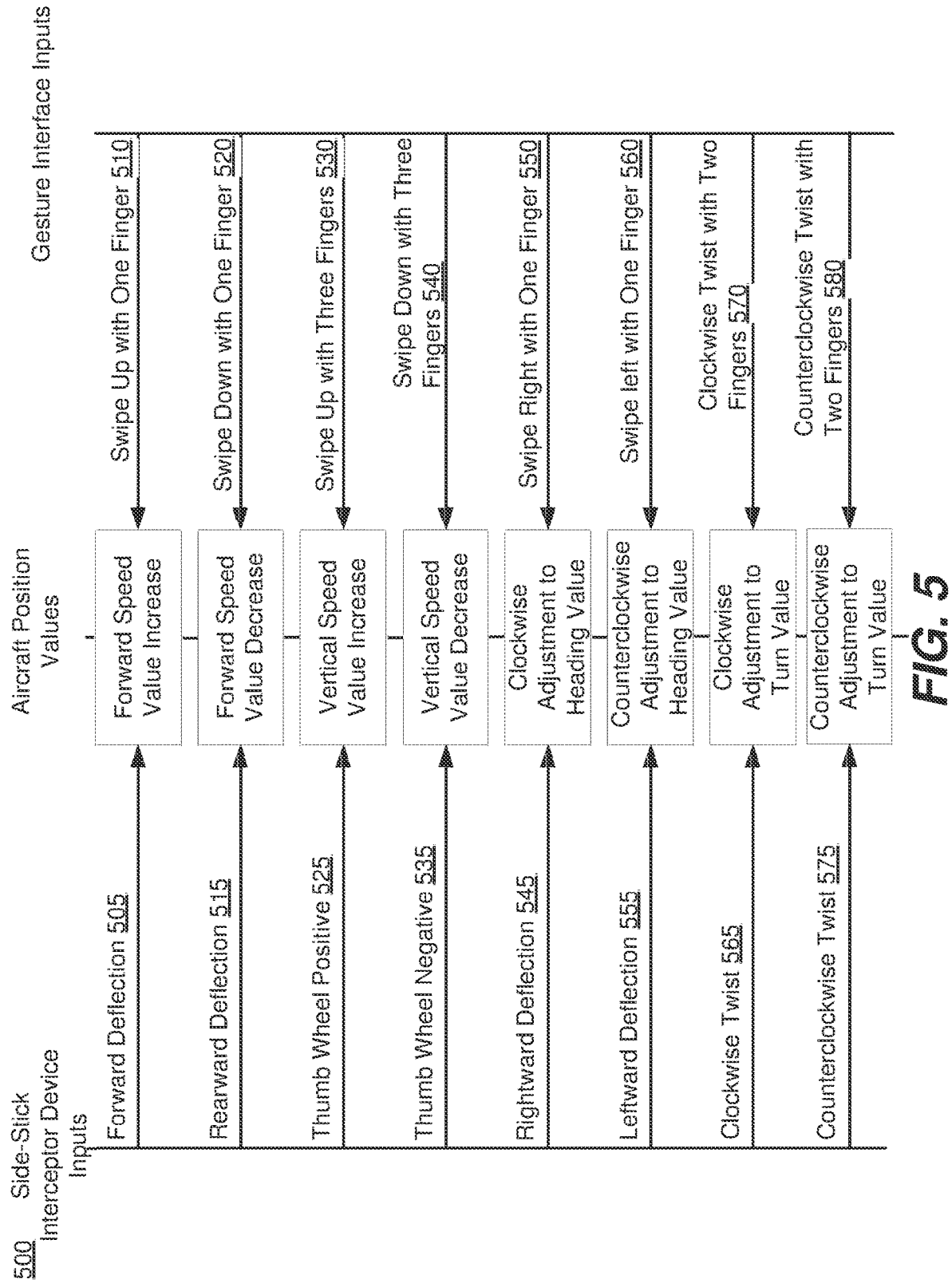
FIG. 5. illustrates one example embodiment of a mapping between universal aircraft control inputs and universal aircraft trajectory values.

FIG. 5 illustrates one embodiment of a mapping 500 between universal aircraft control inputs and universal aircraft trajectory values. For example, the universal aircraft control inputs may be included in the universal aircraft control inputs 330. Similarly, the universal aircraft trajectory values may be determined by the command processing module 365. In the embodiment shown, the mapping 500 maps inputs received from an inceptor device (e.g., the inceptor device 240) and a gesture interface (e.g., the gesture interface 220) to corresponding aircraft trajectory values. The inceptor device is configured for forward, rearward, rightward, and leftward deflection and clockwise and counterclockwise twists, and includes a thumbwheel that can receive positive or negative adjustment. The gesture interface is configured to receive single, double, and triple finger touch inputs. The mapping 500 is intended for the purpose of illustrations only, and other mappings may map inputs received from the same or different interfaces to fewer, additional, or different universal aircraft trajectory values.

As depicted in FIG. 5, a forward deflection 505 of the inceptor device and a swipe up with one finger 510 on the gesture interface both map to a forward speed value increase. A rearward deflection 515 of the inceptor device and a swipe down with one finger 520 on the gesture interface both map to a forward speed value decrease. A thumb wheel positive input 525 on the inceptor device and a swipe up with three fingers 530 on the gesture interface both map to a vertical rate value increase. A thumb wheel negative input 535 on the inceptor device and a swipe down with three fingers 540 on the gesture interface both map to a vertical rate value decrease. A rightward deflection 545 of the inceptor device and a right swipe with one finger 550 on the gesture interface both map to a clockwise adjustment to a heading value. A leftward deflection 555 of the inceptor device and a left swipe with one finger 560 on the gesture interface both map to a counterclockwise adjustment to a heading value. A clockwise twist 565 of the inceptor device and a clockwise twist with two fingers 570 on the gesture interface both map to a clockwise adjustment to a turn value. A counterclockwise twist 575 of the inceptor device and a counterclockwise twist with two fingers 580 on the gesture interface both map to a counterclockwise adjustment to a turn value.

As described above with reference to the universal vehicle control interfaces 110, the mapping 500 may adjust according to a phase of operation of the aircraft. For instance, the rightward deflection 545 and the swipe right with one finger 550 may map to a lateral movement for a rotorcraft (e.g., a strafe) if the rotor craft is hovering. Similarly, the rightward deflection 545 and the swipe right with one finger 550 may be ignored for a fixed-wing aircraft if the fixed-wing aircraft is grounded.

Figure 6A:
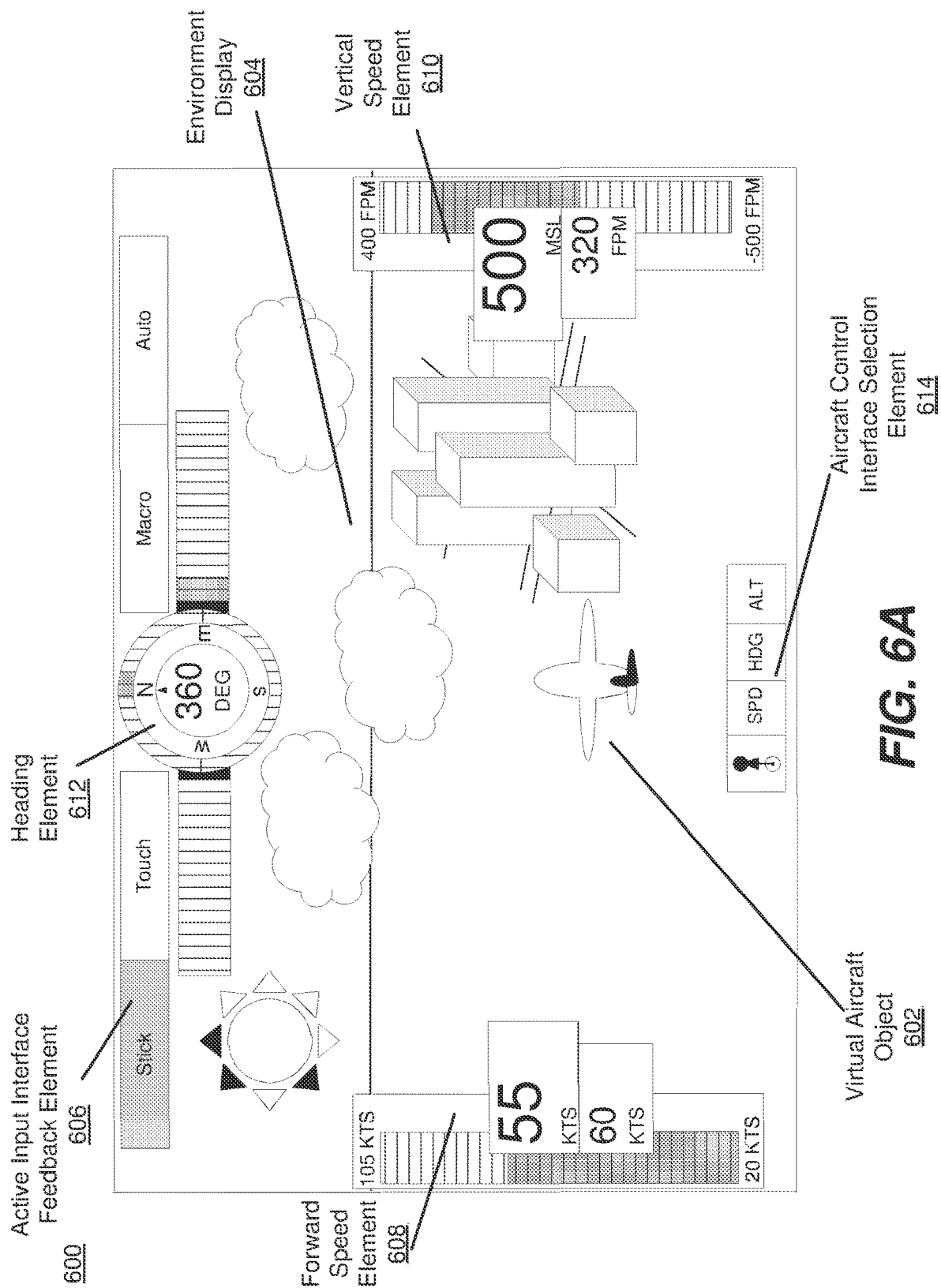
FIG. 6A illustrates one example embodiment of a first aircraft state interface.

FIG. 6A illustrates one embodiment of a first aircraft state interface 600. The aircraft state interface 600 may be an embodiment of a universal vehicle control interface 110 provided by the vehicle control and interface system 100. For example, the aircraft state interface 600 may be an embodiment of an interface displayed by the vehicle state display 230, such as the multi-function interface 220. In other cases, the aircraft state interface 600 may be provide for display on a virtual reality (VR) or augmented reality (AR) headset, overlaying a portion of the windshield of an aircraft, or any other suitable display mechanism.

In the embodiment shown, the aircraft state interface 600 includes a visualization of a virtual aircraft object 602 representative of a state of a physical aircraft. As depicted in FIG. 6A the virtual aircraft object represents a fixed-wing aircraft (e.g., an airplane), such as if the physical aircraft is a fixed-wing aircraft. In other cases, the virtual aircraft object 602 may represent other aircraft, vehicles, or other suitable objects or shapes (e.g., an arrow). The virtual aircraft object 602 may be adjusted (e.g., by the vehicle control and interface system 100) based on changes to the state of the physical aircraft. For example, responsive to determining that the physical aircraft is turning left, the vehicle control and interface system 100 may adjust the display of the virtual aircraft object 602 to visualize a left turn. In this way, the aircraft state interface 600 can provide visual feedback to a human operator of the visual aircraft. In some cases the virtual aircraft object 602 is displayed in a fixed location (e.g., illustrating or excluding orientation) with the surroundings continuously shifting relative to the aircraft (e.g., fixed aircraft position $3_{rd}$ person view), or the display of the virtual aircraft object 602 can move relative to the surroundings (e.g., over a map, over a ground track, over a rendered environment, within a predetermined deviation from a central position, etc.). Additionally, or alternatively, the virtual aircraft object 602 may not be included in the aircraft state interface 600 and the aircraft state interface 600 can instead, e.g., depict a first-person view (e.g., mimicking the view out of the cockpit) of the environment display 604, as described below.

The aircraft state interface 600 further includes an environment display 604. The environment displays 604 represents a physical environment in which the physical aircraft is operating. As depicted in FIG. 6A, the environment display 604 includes a rendering of various environmental features, for example, a sun position, clouds position, building locations, and a ground plane. The features of the physical environment 604 may be virtually rendered using various techniques, such as using virtual objects, augmented reality (e.g., map or satellite images), or some combination thereof. In some embodiments, the environment display 604 is augmented with virtual objects to convey various information to a human operator of the physical aircraft. For instance, the environment display 604 can include a forecasted flightpath for the physical aircraft or a set of navigational targets delineating a planned flightpath for the physical aircraft, as described in greater detail below with reference to FIGS. 6B and 6C. The environment display 604 can additionally or alternatively include other visual elements.

In some embodiments, the vehicle control and interface system 100 generates the environment display 604 based on a computer vision pose of the physical aircraft (e.g., of the current aircraft conditions, global aircraft position or orientation). The pose can be determined based on GPS, odometry, trilateration from ground fiducials (e.g., wireless fiducials, radar fiducials, etc.), or other signals. The vehicle control and interface system 100 may generate the environment display 604 from suitable terrain database, map, imaging or other sensor data generated by the physical aircraft, or other suitable data. As an example, the vehicle control and interface system 100 may select a map segment using the aircraft pose, determine an augmented field of view or perspective, determine augmented target placement, determine pertinent information (e.g., glideslope angle), determine a type of virtual environment (e.g., map vs rendering), or any other suitable information based on the pose of the physical aircraft. The environment display 604 can be pre-rendered, rendered in real time (e.g., by z-buffer triangle rasterization), dynamically rendered, not rendered (e.g., 2D projected image, skin, etc.) or otherwise suitably generated relative to the view perspective.

The aircraft state interface 600 further includes a set of interface elements overlaying the environment display 604. The set of interface elements include an active input feedback interface element 606, a forward speed element 608, a vertical speed element 610, a heading element 612, and an aircraft control interface selection element 614.

The active input feedback interface element 608 indicates an aircraft interface that is currently providing aircraft control inputs, such as one of the aircraft interfaces 305. As depicted in FIG. 6A, a side-stick inceptor device (e.g., the side-stick inceptor device 240) is currently providing input, as indicated by the grey highlight of the box labeled "stick."

The forward speed element 608, the vertical speed element 610, and the heading element 612 each include information indicating a current aircraft control input value and information indicating a respective value for a current state of the aircraft.

In particular, the forward speed element 608 includes a vertical bar indicating a possible forward speed input value range from 20 knots (KTS) to 105 knots, where the grey bar indicates a current forward speed input value of 60 KTS. The forward speed element 608 also includes a bottom text box including text indicating the current forward speed input value. Further, the forward speed element 608 includes a top text box indicating a current forward speed value for the aircraft of 55 KTS.

Similar to the forward speed element 608, the vertical speed element 610 includes a vertical bar indicating a possible vertical speed input value range from −500 feet per minute (FPM) to 400 FPM, where the grey bar indicates a current vertical speed input value of 320 FPM. The vertical speed element 610 also includes a bottom text box including text indicating the current vertical speed input value. Further, the vertical speed element 610 includes a top text box indicating a current altitude value for the aircraft of 500 feet above mean sea level (MSL).

The heading element 612 includes a virtual compass surrounded by a circular bar indicating a possible heading input value range from −360 degrees (DEG) to +360 DEG. where the grey bar indicates a current heading input value of +5 DEG. The heading element 612 further includes horizontal bars on either side of the circular bar indicating the range of possible heading input values and a grey bar indicating the current heading input value. The virtual compass of the heading element 612 indicates a current heading value for the aircraft of 360 DEG.

The aircraft control interface selection element 614 facilitates selection of an aircraft control interface from a set of four aircraft control interfaces. As depicted in FIG. 6A, the set of aircraft control interfaces 614 include aircraft control interfaces that can receive through the aircraft state interface 600 or another digital interface. In particular, the set of aircraft control interfaces include a gesture interface for receiving gesture touch inputs (as indicated by an interface element including an icon illustrating a single finger upward swipe), a forward speed macro for receiving a requested aircraft forward speed (as indicated by an interface element labeled "SPD"), a heading macro for receiving a requested aircraft heading (as indicated by an interface element labeled "HDG"), and an altitude macro for receiving a requested aircraft altitude (as indicated by an interface element labeled "ALT"). As an example, a user of the aircraft state interface 600 may select from the set of aircraft control interfaces by via touch inputs (e.g., taps) on the respective interface elements).

In some embodiments, the aircraft state interface 600 or another interface may display additional interface elements corresponding to a selected aircraft control interface from the set of aircraft control interfaces. For example, if the gesture interface is selected the aircraft state interface 600 may display an additional interface including illustrations of the gesture touch inputs for providing universal aircraft control inputs, such as illustrations similar to those depicted in FIG. 4. Similarly, if the forward speed, heading or altitude macro are selected the aircraft state interface 600 may display respective additional interfaces including interface elements for receiving information describing a requested aircraft state, such as a requested forward velocity, a requested heading, or a requested altitude, respectively. In one embodiment, the aircraft state interface 600 displays the additional interfaces corresponding to a selected aircraft control interface in a drop-down interface extending below the aircraft state interface 600 as depicted in FIG. 6A.

Figure 6B:
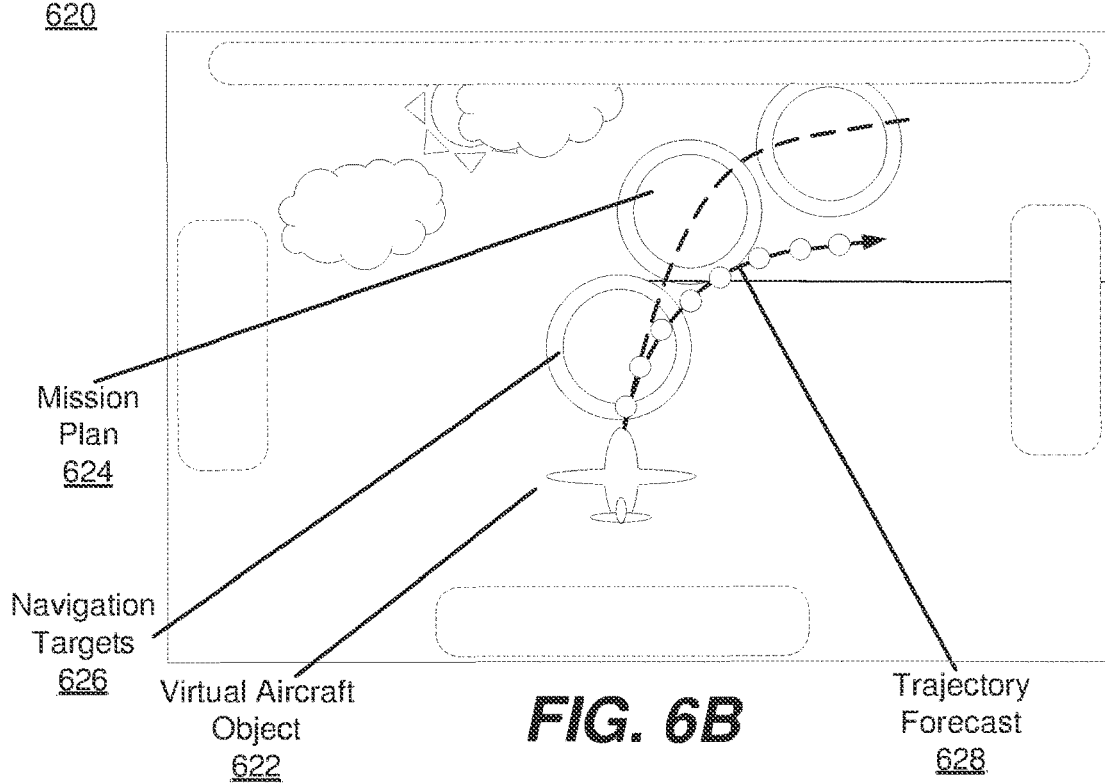
FIG. 6B illustrates one example embodiment of a second aircraft state interface.

FIG. 6B illustrates one embodiment of a second aircraft state interface 620. As with the aircraft state interface 600, the aircraft state interface 620 may be an embodiment of a universal vehicle control interface 110 provided by the vehicle control and interface system 100. Also similar to the aircraft state interface 600, the aircraft state interface 620 includes a virtual aircraft object 622, an environment display, and various interface elements (as indicated by the dashed rectangles). As such, the description of these features of the aircraft state interface 600 are also applicable to these features of the aircraft state interface 620.

As depicted in FIG. 6B, the aircraft state interface 620 additionally includes a set of virtual objects augmenting the environment display to facilitate navigation of a physical aircraft corresponding to the virtual aircraft object 622. The set of virtual objects includes a mission plan 624, navigation targets 626, and a trajectory forecast 628. The mission plan 624 indicates a current mission plan for the physical aircraft in the environment display, such as a mission to navigate the aircraft from a starting location to a target location. In particular, the mission plan 624 is a 3D line indicating a flight path for achieving the mission plan. The navigation targets 626 are 3D rings along the mission plan 624 providing visual checkpoints for following the mission plan 624. For example, the navigation targets 626 may be suitable for zero-visibility situations (e.g., while the physical aircraft is in a cloud, in fog, at night, during a storm, etc.), where conventional visual cues are otherwise unavailable to the operator. Other examples of navigation targets 626 may be gates, annulus, torus, hoops, disks, or any other suitable shape indicating a discrete checkpoint. The trajectory forecast 628 indicates a current trajectory of the physical aircraft in the environment display based on a current state of the physical aircraft. For example, a human operator of the aircraft may deviate from the mission plan 624 by controlling one or more universal input vehicle controllers (e.g., the gesture interface 320 or the stick inceptor device 315). In this way, the trajectory forecast 628 provides visual feedback to the human operator to indicate the result of universal control inputs on a trajectory of the aircraft. The vehicle control and interface system 100 may determine the trajectory forecast 628 in consideration of current wind conditions for the physical aircraft. In different flight phases of the aircraft, additional indicators may appear to help a human operator of the physical aircraft provide inputs for efficient takeoffs or landings.

In alternative embodiments than those depicted in FIG. 6B, the trajectory forecast 628 includes a ground trajectory visualization in addition or alternatively an air trajectory visualization similar to the trajectory forecast 628 depicted in FIG. 6B. For example, the ground trajectory visualization and the air trajectory visualization may parallel lines extending out from the virtual aircraft object 622 and projecting along the ground and into the air of the environment display of the aircraft state interface 620, respectively.

Figure 6C:
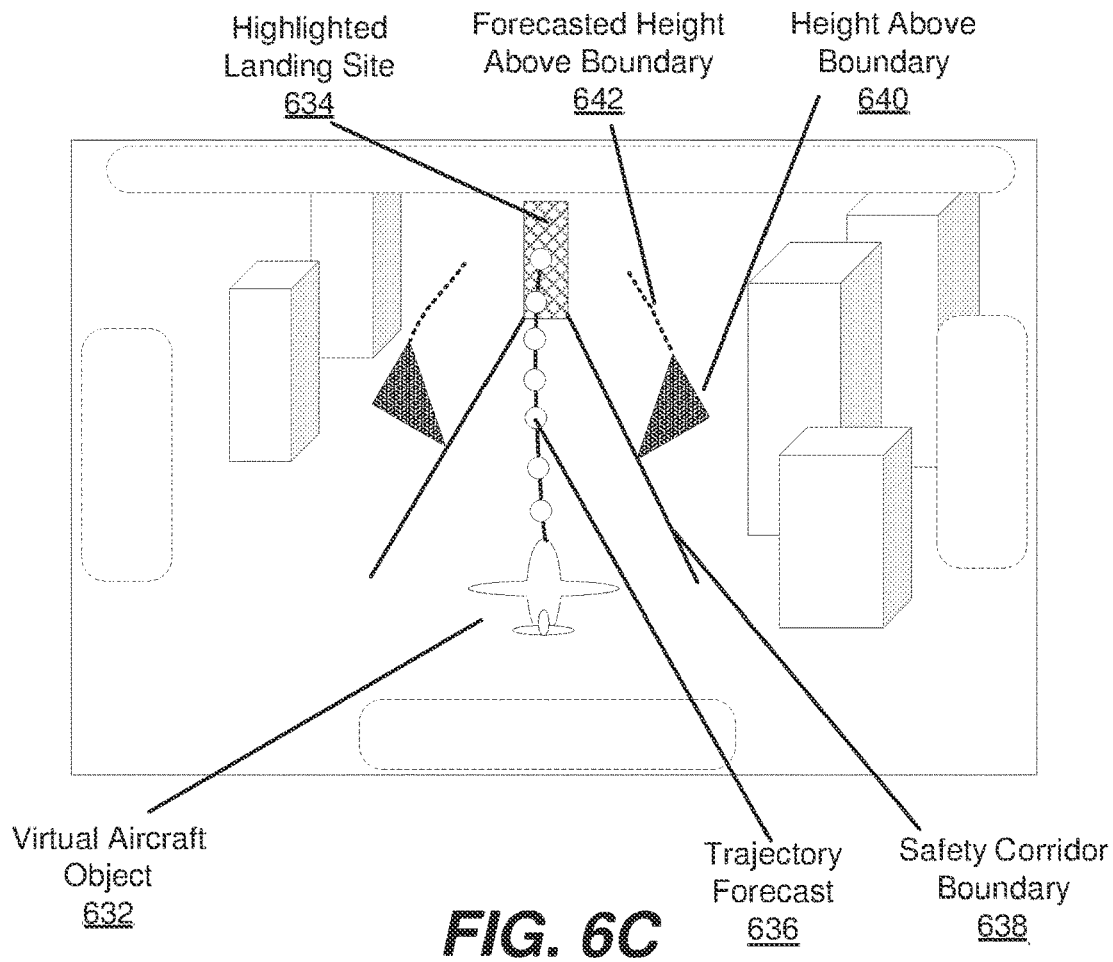
FIG. 6C illustrates one example embodiment of a third aircraft state interface.

FIG. 6C illustrates one embodiment of a third aircraft state interface 630. As with the aircraft state interfaces 600, the aircraft state interface 630 may be an embodiment of a universal vehicle control interface 110 provided by the vehicle control and interface system 100. Also similar to the aircraft state interface 600, the aircraft state interface 630 includes a virtual aircraft object 632, an environment display, and various interface elements. As such, the description of these features of the aircraft state interface 600 are also applicable to these features of the aircraft state interface 650.

As depicted in FIG. 6C, the aircraft state interface 640 additionally includes a set of virtual objects augmenting the environment display to facilitate a landing of a physical aircraft corresponding to the virtual aircraft object 632. The set of virtual objects includes a highlighted landing site 634, a trajectory forecast 636, a safety corridor boundary 638, a height above boundary 640, and a forecasted height above boundary 642. The highlighted landing site 634 indicates a location in the environment display corresponding to a physical landing site for the physical aircraft, such as a landing site selected by an operator of the physical aircraft via the aircraft state interface 630. As with the trajectory forecast 628, the trajectory forecast 636 indicates a current trajectory of the physical aircraft in the environment display based on a current state of the physical aircraft. As depicted in FIG. 6C, the trajectory forecast 636 indicates that the physical aircraft is on a trajectory to land at the highlighted landing site 634. The safety corridor boundary 638 provides a visual indication in the environment display of a corridor within which the physical aircraft can safely navigate. The height above boundary 640 indicates a minimum altitude as a triangular wall projected onto a surrounding terrain topography (e.g., the buildings on either side of the safety corridor boundary 638). Similarly, the forecasted height above boundary 642 indicates a forecasted minimum altitude as a line extending away from the height above boundary 640 in the direction the virtual aircraft object 632 is directed to. More generally, the vehicle control and interface system 100 can determine or display boundaries corresponding to lanelines, tunnels (e.g., wireframe), virtual 'bumpers,' translucent 'walls' or other suitable boundaries. Such boundary interface elements can provide improved awareness or visualization relative to a 'path' in 3D-space, since it can be easier for an operator to interpret the relative location of a discrete target (or stay within a lane in the continuous case) than to track to a point, line, or curve in 3D space—which can be difficult for a user to parse on a 2D screen even from a perspective view.

Figure 6D:
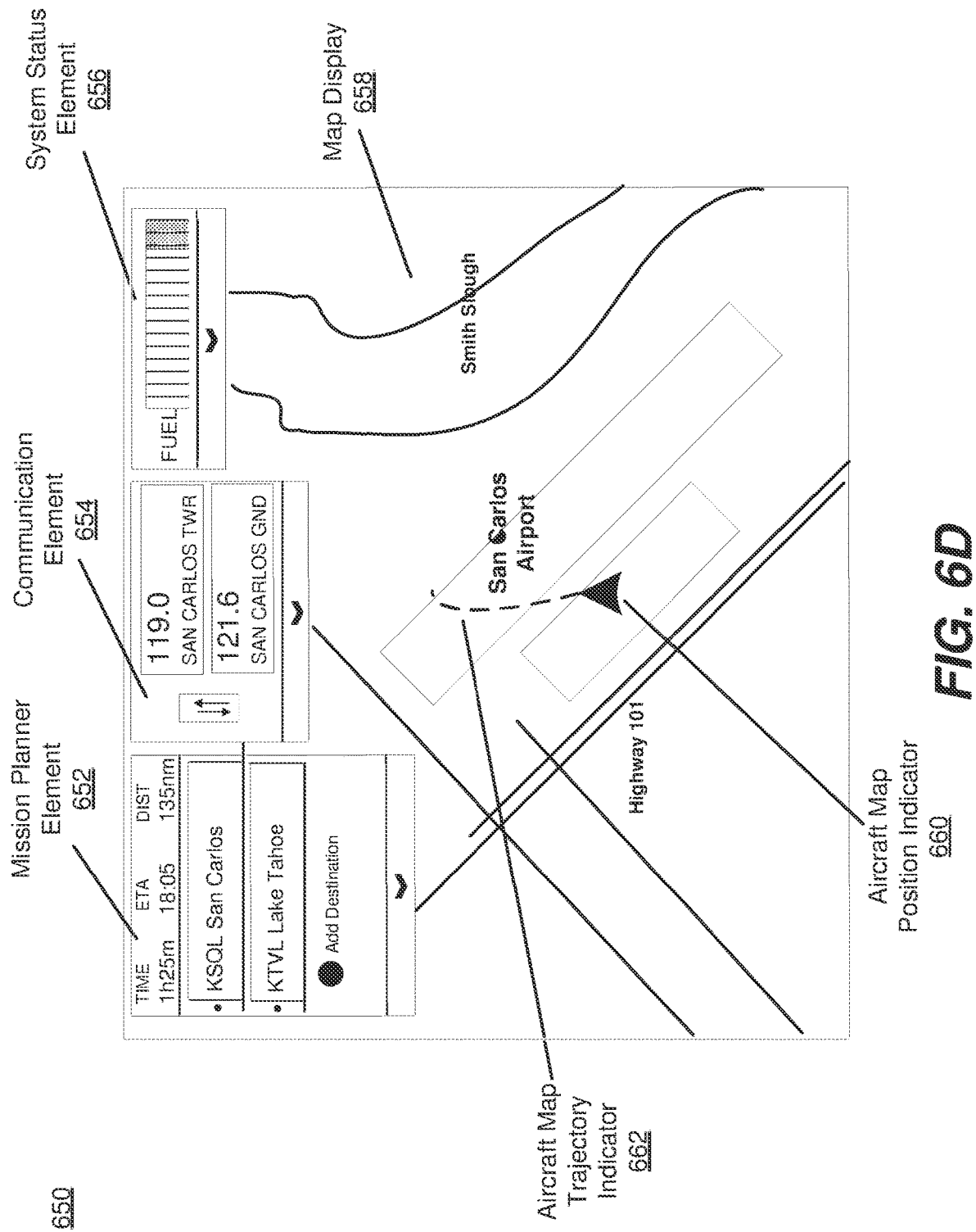
FIG. 6D illustrates one example embodiment of a fourth aircraft state interface.

FIG. 6D illustrates one embodiment of a fourth aircraft state interface 650. The aircraft state interface 650 may be an embodiment of a universal vehicle control interface 110 provided by the vehicle control and interface system 100. For example, the aircraft state interface 650 may be an embodiment of the multi-function interface 220. As depicted in FIG. 6D, the aircraft state interface 650 includes a mission planner element 652, a communication element 654, a system health element 656, a map display 658, an aircraft map position 660, and an aircraft map trajectory 662.

The mission planner element 652 facilitates interaction with navigation information, such as a routing database, inputting an origin or destination location, selecting intermediary waypoints, etc. As depicted in FIG. 6D, the mission planner element 652 includes information describing a route including two destinations (KSQL San Carlos and KTVL Lake Tahoe). The mission planner element 652 further includes route statistics (e.g., time to destination, estimated time of arrival (ETA), and distance to destination). In other cases the mission planner element 652 may include other metadata about the route (e.g., scenic characteristics, relative length, complexity, etc.). In some embodiments, the mission planner element 652 includes information describing available destination locations, such as fueling or weather conditions at or on the way to a destination location.

The communication element 654 includes information describing relevant radio frequencies. For instance, the relevant radio frequencies may be based on a current position of the aircraft, a current mission for the aircraft, or other relevant information. In the same or different embodiments, the communication element 654 may include other communication-related information.

The system status element 656 includes information describing a status of the aircraft determined according to an estimated state of the aircraft (e.g., the estimated aircraft state 340). As depicted in FIG. 6D, the internal system status element 656 includes an indicator of a current fuel level for the aircraft. The system status element may display a status for a particular component of the aircraft responsive to the status meeting a threshold indicating the status is pertinent. In this way, the system status element 656 may dynamically provide notifications describing a component status to an operator of the vehicle after it becomes pertinent. For example, the current fuel level may be displayed on the system status element 656 responsive to the estimated state of the aircraft indicating the fuel level has dropped below a threshold fuel level. Other indicators the internal system status element 656 may include are indicators describing powerplant data, manifold pressure, cylinder head temperature, battery voltage, inceptor status, etc. In some cases a full or partial list of aircraft component status may be accesses as a dropdown menu by interacting with the downward arrow on the system status element 656.

In some embodiments, some or all of the mission planner element 652, the communication element 654, or the system health element 656 are not persistently included on the aircraft state interface 650. Instead, the aircraft interface 650 is adjusted (e.g., by the vehicle control and interface system 100) to include some or all of these elements in response to triggers or events. In the same or different embodiments, the mission planner element 652, the communication element 654, or the system health element 656 include pertinent information. Pertinent information represents a limited set of information provided for display to the human operator at a particular time or after a particular event. For example, a human operator can be relied upon to process information or a direct attention according to a prioritization of: 1. aviate; 2. navigate; and 3. communicate. As only a subset of information describing a state of the physical aircraft is required for each of these tasks, the human operator can achieve these tasks more efficiently if pertinent information is displayed and irrelevant information is not displayed, which can be extraneous or distracting for the human operator. Pertinent information can include various apposite parameters, notifications, values, type of visual augmentation (e.g., two dimensional (2D), two and a half dimensional (2.5D), three dimensional (3D), augmentation mode, virtual environment.

The map display 658 is an virtual geographical map including an aircraft map position indicator 660 and an aircraft map trajectory indicator 662. The map display 658 includes virtual geographical data for a geographical region. The map display 658 may be generated using map data from various map databases. The aircraft map trajectory indicator 660 provides a visual indication of a geographical location of the aircraft relative to the geographical region displayed by the map display 658. Similarly, the aircraft map trajectory indicator 662 provides a visual indication of a trajectory of the aircraft in the geographical region of the map display 658. For example, the aircraft map trajectory 662 may be a 2D projection of the trajectory forecasts 628 or 636.

The particular interface elements depicted in FIGS. 6A-6D are selected for the purpose of illustration only, and one skilled in the art will appreciate that the interfaces 600, 620, 630, and 650 can include fewer, additional, or different interface elements arranged in the same or different manner.

Computing Machine Architecture

Figure 7:
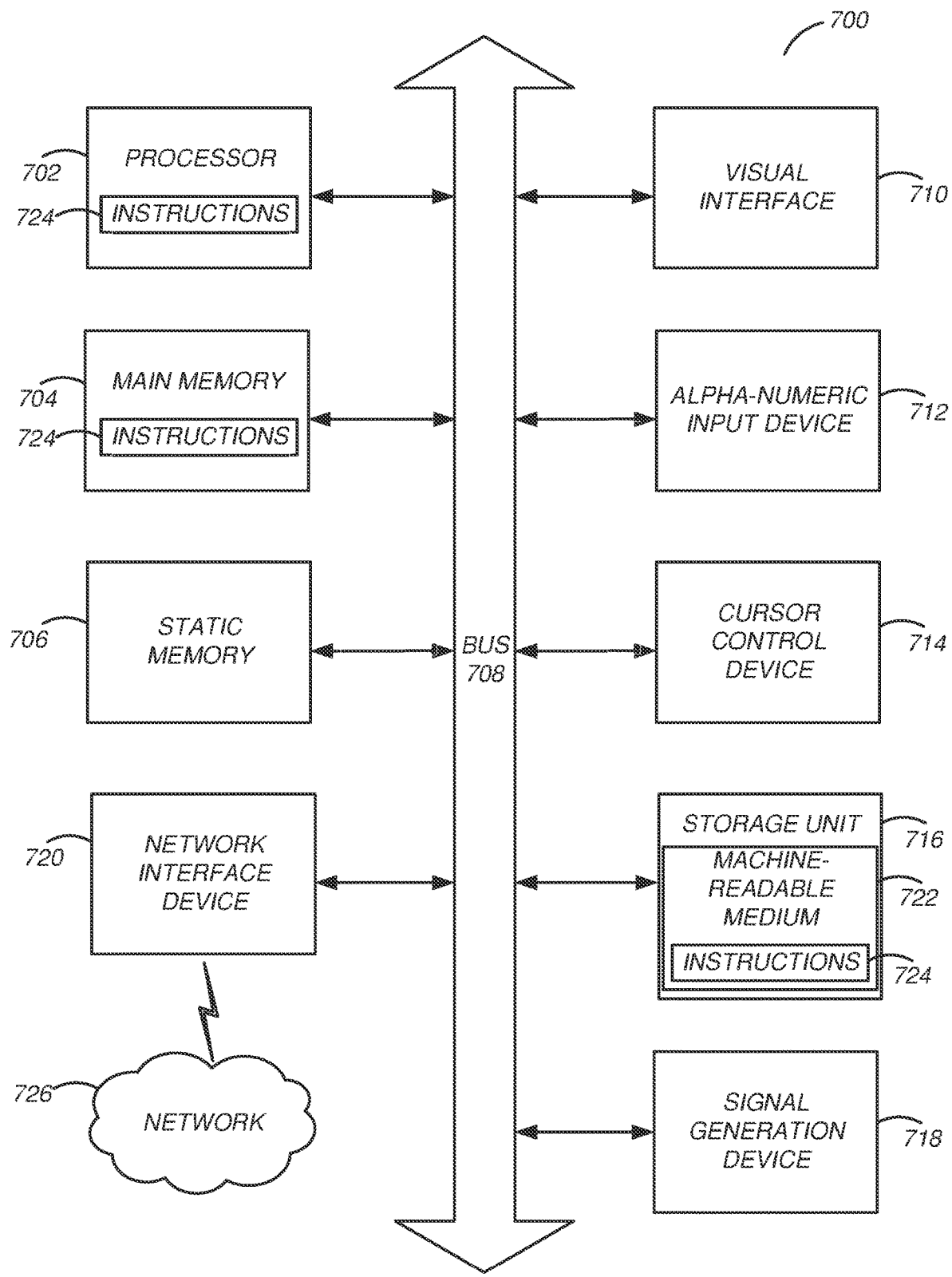
FIG. 7 is a block diagram illustrating one example embodiment of components of an example machine able to read instructions from a machine-readable medium and execute them in a processor (or controller).

FIG. 7 is a block diagram illustrating one embodiment of components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The computer system 700 may be used for one or more components of the vehicle control and interface system 100 depicted and described through FIGS. 1-6 and 8. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 724 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 700 includes one or more processors 702 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 704, and a static memory 706, which are configured to communicate with each other via a bus 708. The computer system 700 may further include visual display interface 710. The visual interface may include a software driver that enables (or provide) user interfaces to render on a screen either directly or indirectly. The visual interface 710 may interface with a touch enabled screen. The computer system 700 may also include input devices 712 (e.g., a keyboard a mouse), a storage unit 716, a signal generation device 718 (e.g., a microphone and/or speaker), and a network interface device 720, which also are configured to communicate via the bus 708.

The storage unit 716 includes a machine-readable medium 722 (e.g., magnetic disk or solid-state memory) on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution.

Example Process for Converting Universal Control Inputs to Vehicle Commands

FIG. 8 is a flow diagram illustrating one embodiment of a process 800 for generating actuator commands for aircraft control inputs via an aircraft control router. In the example embodiment shown, the aircraft control router is illustrated performing the steps of the process 800. However, some or all of the steps may be performed by other entities or components. In addition, some embodiments may perform the steps in parallel, perform the steps in different orders, or perform different steps. The aircraft control router may be an embodiment of the universal vehicle control router 120, such as the universal aircraft control router 310. Furthermore, the aircraft control router may be integrated with one or more computer systems, such as the computer system 700 described above with reference to FIG. 7.

The process 800 includes the aircraft control router, e.g., 310, receiving 810 aircraft control inputs describing a requested trajectory for an aircraft. For example, a human operator of an aircraft may provide the aircraft control inputs via one of the aircraft interfaces 305. The aircraft control inputs may include one or more of a forward speed control input, a lateral speed control input, a vertical speed control input, or a turn control input, e.g., as described above with reference to FIGS. 4 and 5.

The process 800 includes the aircraft control router, e.g., 310, generating 820, using the aircraft control inputs, a plurality of trajectory values for axes of movement of the aircraft, the plurality of trajectory values corresponding to the requested trajectory. For instance, the aircraft control router may convert the aircraft control inputs to corresponding trajectory values for axes of movement of the aircraft. As an example, if the aircraft control inputs include some or all of a forward speed control input, a lateral speed control input, a vertical speed control input, or a turn control input, the aircraft control router may determine one or more of a corresponding aircraft x-axis velocity, aircraft y-axis velocity, aircraft z-axis velocity, or angular velocity about a yaw axis of the vehicle (e.g., a yaw).

The process 800 includes the aircraft control router generating 830, using information describing characteristics of the aircraft and the plurality of trajectory values, a plurality of actuator commands to control the plurality of actuators of the aircraft. The aircraft control router may apply a set of control laws to the plurality of trajectory values in order to determine allowable trajectory values for the axis of movement of the aircraft. The information describing characteristics of the aircraft may include various information, such as a model including parameters for the aircraft or an estimated state of the aircraft. Furthermore, the aircraft control router may convert the plurality of trajectory values to the plurality of actuator commands using one or both of an outer processing loop and an inner processing loop, as described above with reference to the universal aircraft control router 310.

The process 800 includes the aircraft control router transmitting 840 the plurality of actuators commands to corresponding actuators to adjust a current trajectory of the aircraft to the requested trajectory. Alternatively, or additionally, the aircraft control router may transmit some or all of the actuator commands to other components of the aircraft to be used to control relevant actuators.

Additional Configuration Considerations

The disclosed configurations beneficially provide for a vehicle control and interface system that facilitates universal, simple, and safe mechanisms for vehicle operation. Among other advantages, such mechanisms enable significantly reduced training of human operators for effective operation of vehicles of varying types (e.g., aircraft, motor vehicles, watercraft, etc.). For instance, a human operator can operate a variety of vehicles integrated with the vehicle control and interface system after being trained to operate the vehicle control and interface system once. In contrast, conventional control and interface systems for vehicles require individualized and extensive training processes, often involving a licensing or certification procedures for each type of vehicle.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An aircraft control router for an aircraft, the aircraft control router comprising:
 a command processing module configured to:
  receive aircraft control inputs from aircraft interfaces; and
  generate aircraft trajectory values based on the received aircraft control inputs;
 a sensor validation module configured to:
  receive sensor signals generated by sensors of the aircraft; and
  validate one or more of the received sensor signals;
 an aircraft state estimation module configured to:
  receive first validated sensor signals from the sensor validation module; and
  determine an estimated aircraft state of the aircraft based on the received first validated sensor signals; and
 a control laws module configured to:
  receive aircraft trajectory values from the command processing module, receive second validated sensor signals from the sensor validation module, and receive the estimated aircraft state of the aircraft from the aircraft state estimation module;
  generate actuator commands for actuators of the aircraft to adjust control surfaces of the aircraft, the generated actuator commands based on the received aircraft trajectory values, the received second validated sensor signals, and the estimated aircraft state of the aircraft; and
  transmit the actuator commands to actuators of the aircraft.

2. The aircraft control router of claim 1, further comprising an automated aircraft control module configured to:
 receive the estimated aircraft state of the aircraft from the aircraft state estimation module;
 generate second aircraft control inputs based on the estimated aircraft state; and
 transmit the generated second aircraft control inputs to the command processing module.

3. The aircraft control router of claim 1, wherein the control laws module comprises:
 an outer processing loop configured to apply a set of control laws based on operation limits of the aircraft to the received aircraft trajectory values to convert the received aircraft trajectory values to corresponding allowable aircraft trajectory values; and
 an inner processing loop configured to generate the actuator commands based on the allowable aircraft trajectory values.

4. The aircraft control router of claim 1, wherein the aircraft interfaces include at least one of:
 one or more of a gesture interfaces;
 a stick inceptor device; or
 an automated control interface.

5. The aircraft control router of claim 1, wherein the aircraft interfaces consist of:
 one or more stick inceptor devices; and
 one of more gesture interfaces.

6. The aircraft control router of claim 1, wherein the aircraft control inputs are only received from:
 one or more stick inceptor devices; and
 one or more gesture interfaces.

7. The aircraft control router of claim 1, wherein the command processing module is further configured to apply different smoothing operations to at least a subset of the received aircraft control inputs based on aircraft control interfaces that provided the subset of the received aircraft control inputs.

8. A method comprising:
 receiving aircraft control inputs from aircraft interfaces of an aircraft;
 generating aircraft trajectory values based on the received aircraft control inputs;
 receiving sensor signals generated by sensors of the aircraft;
 validating one or more of the received sensor signals;
 receiving first validated sensor signals;
 determining an estimated aircraft state of the aircraft based on the first received validated sensor signals;
 receiving aircraft trajectory values, second validated sensor signals, and the estimated aircraft state of the aircraft;
 generating actuator commands for actuators of the aircraft to adjust control surfaces of the aircraft, the generated actuator commands based on the received aircraft trajectory values, the second received validated sensor signals, and the estimated aircraft state of the aircraft; and
 transmitting the actuator commands to actuators of the aircraft.

9. The method of claim 8, further comprising:
 receiving the estimated aircraft state of the aircraft; and
 generating second aircraft control inputs based on the estimated aircraft state,
 wherein generating the aircraft trajectory values is further based on the second aircraft control inputs.

10. The method of claim 8, further comprising:
 applying, by an outer processing loop, a set of control laws based on operation limits of the aircraft to the received aircraft trajectory values to convert the received aircraft trajectory values to corresponding allowable aircraft trajectory values,
 wherein generating the actuator commands is performed by an inner processing loop and is based on the allowable aircraft trajectory values.

11. The method of claim 8, wherein the aircraft interfaces include at least one of:
 one or more of a gesture interfaces;
 a stick inceptor device; or
 an automated control interface.

12. The method of claim 8, wherein the aircraft interfaces consist of:
 one or more stick inceptor devices; and
 one of more gesture interfaces.

13. The method of claim 8, wherein the aircraft control inputs are only received from:
 one or more stick inceptor devices; and
 one or more gesture interfaces.

14. The method of claim 8, further comprising applying different smoothing operations to at least a subset of the received aircraft control inputs based on aircraft control interfaces that provided the subset of the received aircraft control inputs.

15. A computer-readable storage medium comprising stored instructions that, when executed by a computer system, cause the computer system to perform operations comprising:
 receiving aircraft control inputs from aircraft interfaces of an aircraft;
 generating aircraft trajectory values based on the received aircraft control inputs;

receiving sensor signals generated by sensors of the aircraft;

validating one or more of the received sensor signals;

receiving first validated sensor signals;

determining an estimated aircraft state of the aircraft based on the received first validated sensor signals;

receiving aircraft trajectory values, second validated sensor signals, and the estimated aircraft state of the aircraft;

generating actuator commands for actuators of the aircraft to adjust control surfaces of the aircraft, the generated actuator commands based on the received aircraft trajectory values, the received second validated sensor signals, and the estimated aircraft state of the aircraft; and transmitting the actuator commands to actuators of the aircraft.

16. The computer-readable storage medium of claim 15, further comprising:

receiving the estimated aircraft state of the aircraft; and generating second aircraft control inputs based on the estimated aircraft state, wherein generating the aircraft trajectory values is further based on the second aircraft control inputs.

17. The computer-readable storage medium of claim 15, further comprising:

applying, by an outer processing loop, a set of control laws based on operation limits of the aircraft to the received aircraft trajectory values to convert the received aircraft trajectory values to corresponding allowable aircraft trajectory values, wherein generating the actuator commands is performed by an inner processing loop and is based on the allowable aircraft trajectory values.

18. The computer-readable storage medium of claim 15, wherein the aircraft interfaces include at least one of:

one or more of a gesture interfaces;

a stick inceptor device; or an automated control interface.

19. The computer-readable storage medium of claim 15, wherein the aircraft interfaces consist of:

one or more stick inceptor devices; and one of more gesture interfaces.

20. The computer-readable storage medium of claim 15, wherein the aircraft control inputs are only received from:

one or more stick inceptor devices; and one or more gesture interfaces.

* * * * *